United States Patent
Maeda et al.

(10) Patent No.: US 12,202,337 B2
(45) Date of Patent: Jan. 21, 2025

(54) DISPLAY DEVICE FOR VEHICLE

(71) Applicants: TOYOTA JIDOSHA KABUSHIKI KAISHA, Aichi-ken (JP); KOJIMA PRESS INDUSTRY CO., LTD., Aichi-ken (JP)

(72) Inventors: Kazuhisa Maeda, Toyota (JP); Tatsuya Shimizu, Okazaki (JP); Takanobu Tabata, Toyota (JP); Yasuyuki Andou, Toyota (JP); Takahiro Suzuki, Toyota (JP); Norifumi Suzuki, Toyota (JP); Fumihiro Onogi, Toyota (JP)

(73) Assignees: TOYOTA JIDOSHA KABUSHIKI KAISHA, Aichi-Ken (JP); KOJIMA PRESS INDUSTRY CO., LTD., Aichi-Ken (JP)

( * ) Notice: Subject to any disclaimer, the term of this patent is extended or adjusted under 35 U.S.C. 154(b) by 125 days.

(21) Appl. No.: 17/709,410

(22) Filed: Mar. 31, 2022

(65) Prior Publication Data
US 2022/0314799 A1     Oct. 6, 2022

(30) Foreign Application Priority Data

Apr. 2, 2021  (JP) ................................ 2021-063676
Aug. 26, 2021  (JP) ................................ 2021-138121

(51) Int. Cl.
*B60K 35/00* (2024.01)
*B60K 35/22* (2024.01)
(Continued)

(52) U.S. Cl.
CPC .............. *B60K 35/00* (2013.01); *B60K 35/22* (2024.01); *B60K 35/28* (2024.01); *B60K 35/29* (2024.01);
(Continued)

(58) Field of Classification Search
CPC ........ B60K 35/00; B60K 35/22; B60K 35/28; B60K 35/29; B60K 35/53; B60K 35/81;
(Continued)

(56) References Cited

U.S. PATENT DOCUMENTS 5,940,120 A     8/1999  Frankhouse et al.
9,855,918 B1 *  1/2018  Melaragni ............... B60R 25/24
(Continued)

FOREIGN PATENT DOCUMENTS

CN  112428933 A  *  3/2021  ......... B60R 11/0229
DE  4128663 A1     12/1992
(Continued)

OTHER PUBLICATIONS

English Translation: Haub et al., DE 4128663 C2, Dec. 1992, German Patent Office Patent Publication (Year: 2002).*
(Continued)

*Primary Examiner* — Rami Khatib
*Assistant Examiner* — Shelley Marie Osterhout
(74) *Attorney, Agent, or Firm* — HAUPTMAN HAM, LLP

(57) ABSTRACT

A display device for a vehicle includes: a display unit including a display surface that is configured to display information to an occupant of a vehicle; a display control unit that is configured to set the information displayed at the display surface and a display area in which the information is displayed at the display surface; a drive unit that is configured to drive the display unit in and out of an interior member that is disposed in a vehicle cabin; and a drive control unit that is configured to control the drive unit such that the display area and an exposed area, of the display surface, which is exposed from the interior member are proportional to each other.

12 Claims, 18 Drawing Sheets

(51) Int. Cl.
*B60K 35/28* (2024.01)
*B60K 35/29* (2024.01)
*B60K 35/53* (2024.01)
*B60K 35/81* (2024.01)

(52) U.S. Cl.
CPC .............. *B60K 35/53* (2024.01); *B60K 35/81* (2024.01); *B60K 2360/176* (2024.01); *B60K 2360/178* (2024.01); *B60K 2360/182* (2024.01); *B60K 2360/1868* (2024.01); *B60K 2360/1876* (2024.01); *B60K 2360/331* (2024.01); *B60K 2360/349* (2024.01)

(58) Field of Classification Search
CPC ........ B60K 2360/176; B60K 2360/178; B60K 2360/182; B60K 2360/1868; B60K 2360/1876; B60K 2360/331; B60K 2360/349; B60K 35/60; B60K 2360/771; B60K 35/223; B60K 35/23
See application file for complete search history.

(56) References Cited

U.S. PATENT DOCUMENTS

| | | |
|---|---|---|
| 2005/0046800 A1 | 3/2005 | Hamada et al. |
| 2006/0050018 A1* | 3/2006 | Hutzel ...................... B60R 1/12 345/60 |
| 2006/0279959 A1 | 12/2006 | Yabashi et al. |
| 2010/0165219 A1 | 7/2010 | Ikunami |
| 2014/0129092 A1* | 5/2014 | Mori ........................ B60K 37/00 701/49 |
| 2017/0217290 A1 | 8/2017 | Yoshizumi et al. |
| 2017/0313192 A1 | 11/2017 | Segawa et al. |
| 2017/0313248 A1 | 11/2017 | Kothari |
| 2018/0286358 A1* | 10/2018 | Wunderlich .......... G06F 1/1677 |
| 2019/0041652 A1* | 2/2019 | Murayama ......... G02B 27/0149 |
| 2019/0061782 A1* | 2/2019 | Cheaz .............. G08G 1/096775 |
| 2019/0202349 A1 | 7/2019 | Winton et al. |
| 2019/0210529 A1 | 7/2019 | Izumi et al. |
| 2020/0055378 A1 | 2/2020 | Yoshizumi et al. |
| 2020/0062176 A1 | 2/2020 | Ishibashi et al. |
| 2020/0062192 A1 | 2/2020 | Ishibashi et al. |
| 2020/0282908 A1* | 9/2020 | Xu ........................... B60R 11/04 |
| 2021/0016663 A1* | 1/2021 | Ha ....................... B60K 35/223 |
| 2021/0129635 A1* | 5/2021 | Park ...................... G09F 21/049 |
| 2021/0206266 A1* | 7/2021 | Shim ...................... B60K 35/25 |
| 2021/0212223 A1* | 7/2021 | Song ...................... B60K 35/00 |
| 2021/0213830 A1* | 7/2021 | Son ......................... G09F 9/301 |
| 2021/0213831 A1* | 7/2021 | Kang ................... G09F 27/005 |
| 2021/0216183 A1* | 7/2021 | Kang ..................... G09F 9/301 |
| 2022/0058996 A1 | 2/2022 | Yoshizumi et al. |
| 2022/0281287 A1* | 9/2022 | Shariatzadeh ............ B60R 7/04 |
| 2022/0314799 A1 | 10/2022 | Maeda et al. |
| 2023/0131157 A1 | 4/2023 | Onogi et al. |
| 2023/0228588 A1* | 7/2023 | Lee ........................ B60K 35/00 701/455 |
| 2023/0249621 A1 | 8/2023 | Maeda et al. |
| 2023/0391193 A1* | 12/2023 | Huang ..................... G06F 3/14 |
| 2024/0135729 A1 | 4/2024 | Kumagai |

FOREIGN PATENT DOCUMENTS

| | | | |
|---|---|---|---|
| DE | 4128663 C2 * | 10/2002 | ............ B60K 37/02 |
| DE | 10226406 C1 | 12/2003 | |
| JP | 2003-025911 A | 1/2003 | |
| JP | 2006-044567 A | 2/2006 | |
| JP | 2016155540 A | 9/2016 | |
| JP | 2018-034715 A | 3/2018 | |
| JP | 2019-031138 A | 2/2019 | |
| JP | 2020-117172 A | 8/2020 | |
| JP | 2020-189618 A | 11/2020 | |
| JP | 2020194179 A | 12/2020 | |
| JP | 2022-158818 A | 10/2022 | |
| KR | 20210016761 A * | 2/2021 | |

OTHER PUBLICATIONS

English Translation: Yang et al., CN 112428933 A, Mar. 2021, Chinese Patent Office Patent Application Publication (Year: 2021).*
ESPACENET Translation of KR20210016761 Description (Year: 2021).*
Office Action in U.S. Appl. No. 18/089,564, mailed May 16, 2024, 18pp.
Notice of Allowance in U.S. Appl. No. 18/089,564, mailed Jul. 19, 2024, 15pp.
Office Action in U.S. Appl. No. 17/709,410, mailed Feb. 1, 2024, 34p.
U.S. Appl. No. 18/069,891, filed Dec. 21, 2022, 96pp.
U.S. Appl. No. 17/709,410, filed Mar. 31, 2022, 46pp.
U.S. Appl. No. 18/163,879, filed Feb. 3, 2023, 44pp.
Office Action in U.S. Appl. No. 18/163,879, mailed Jul. 17, 2024, 45pp.

* cited by examiner

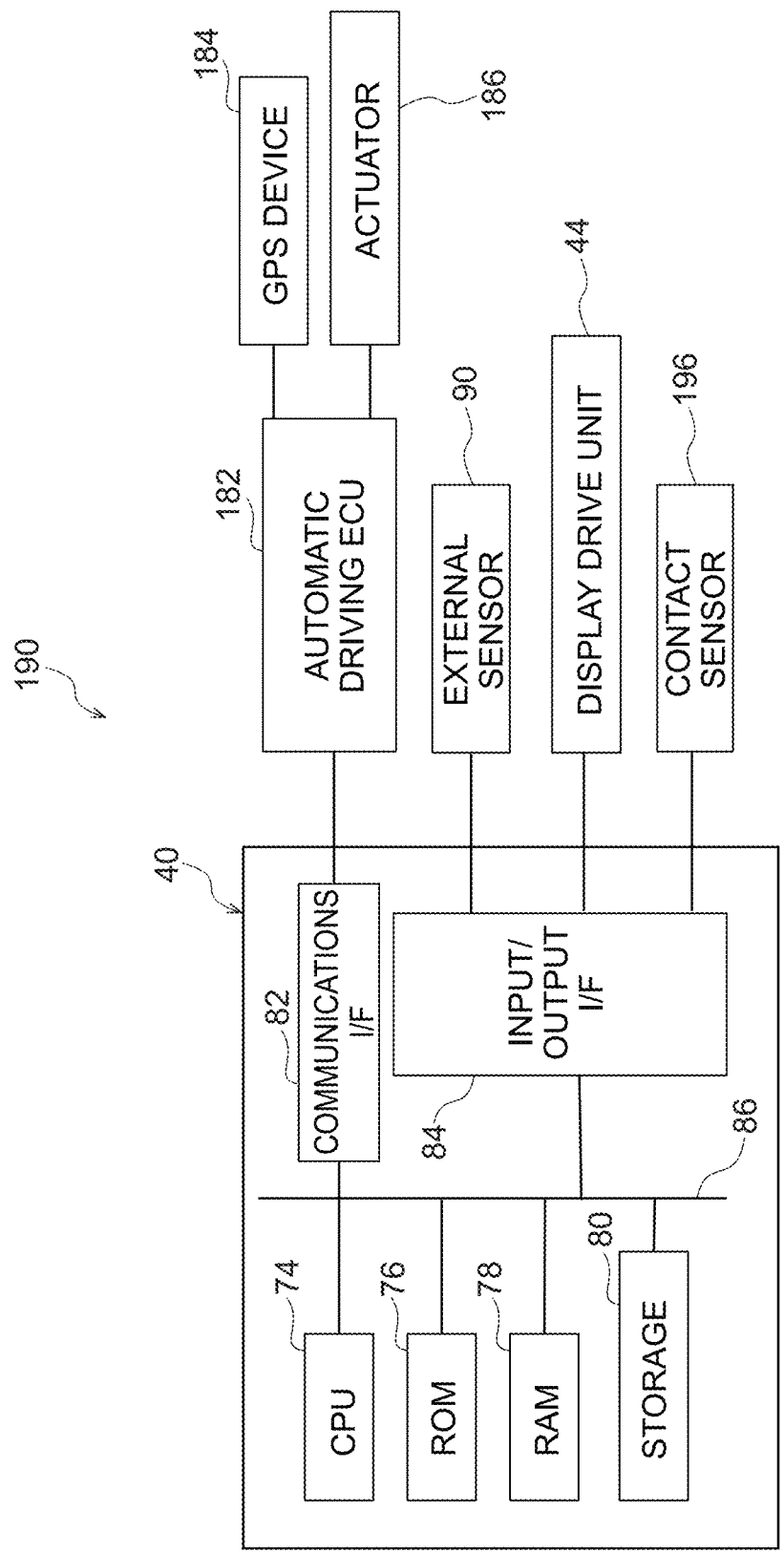

DISPLAY DEVICE FOR VEHICLE

CROSS-REFERENCE TO RELATED APPLICATION

This application is based on and claims priority under 35 USC 119 from Japanese Patent Application Nos. 2021-063676 filed on Apr. 2, 2021, and 2021-138121 filed on Aug. 26, 2021, the disclosures of which are incorporated by reference herein.

BACKGROUND

Technical Field

The present disclosure relates to a display device for a vehicle.

Related Art

Technology relating to a display device for a vehicle is disclosed in Japanese Patent Application Laid-Open (JP-A) No. 2016-155540. This display device for a vehicle takes a first display embodiment and a second display embodiment in which less information is displayed than in the first embodiment, depending on the amount of information to be displayed to the occupant.

Incidentally, in the technology disclosed in JP-A No. 2016-155540, a first display panel is used in the first display embodiment, and a second display panel having a smaller display surface than the first display panel is used in the second display embodiment.

That is, in the technology disclosed in JP-A No. 2016-155540, it is necessary to change a display unit that displays information to the occupant according to the amount of information that is displayed to the occupant.

SUMMARY

In consideration of the above facts, the object of the present disclosure is to obtain a display device for a vehicle that can appropriately display information to an occupant without changing a display unit that displays information to the occupant according to the amount of information.

A display device for a vehicle according to a first aspect of the present disclosure includes: a display unit including a display surface that is configured to display information to an occupant of a vehicle; a display control unit that is configured to set the information displayed at the display surface and a display area in which the information is displayed at the display surface; a drive unit that is configured to drive the display unit in and out of an interior member that is disposed in a vehicle cabin; and a drive control unit that is configured to control the drive unit such that the display area and an exposed area, of the display surface, which is exposed from the interior member are proportional to each other.

According to the display device for a vehicle according to the first aspect, a display unit is provided, and various information can be displayed to an occupant of a vehicle at a display surface of the display unit. The information displayed at the display surface and the display area in which the information is displayed at the display surface are set by the display control unit.

Incidentally, from the viewpoint of effective use of the display surface of the display unit, in a case in which the display area in which information is displayed is small, it is preferable that the area of the display surface which is visible to the occupant is small, and in a case in which the display area is large, it is preferable that the area of the display surface which is visible to the occupant is large. In consideration of this, although it is conceivable to install plural display units having different display surface sizes, in such a configuration, it is necessary to appropriately change the display unit at which the information is displayed in accordance with the amount of information that is displayed to the occupant.

Here, in the present disclosure, the display unit can be moved in and out of the interior member that is disposed in the vehicle cabin by driving the drive unit. Further, since the drive unit is controlled by the drive control unit, an exposed area, of the display surface, which is exposed from the interior member and the display area in which the information is displayed are made proportional to each other.

Therefore, in the present disclosure, at one display unit, in a case in which the display area in which information is displayed is small, the area of the display surface which is visible to the occupant can be reduced, and in a case in which the display area in which information is displayed is large, the area of the display surface which is visible to the occupant can be increased. That is, in the present disclosure, the area of the display surface which is visible to the occupant at one display unit can be set in accordance with the display area in which information is displayed.

The display device for a vehicle according to a second aspect is the display device for a vehicle according to the first aspect, wherein: the display control unit is configured to set the information and the display area based on a signal from an exterior sensor that can acquire surrounding conditions of the vehicle while the vehicle is moving; and the display control unit is configured to set the display area to a first display area in a case in which a degree of urgency of the surrounding conditions is low, and is configured to set the display area to a second display area, which is larger than the first display area, in a case in which the degree of urgency of the surrounding conditions is high.

According to the display device for a vehicle according to the second aspect, the surrounding conditions of the vehicle are acquired by an external sensor while the vehicle is moving. Further, the display control unit can set the information that is displayed at the display surface and the display area in which the information is displayed based on a signal from the external sensor. Therefore, information can be displayed at the display surface based on the surrounding conditions of the vehicle, and the display area of the information can be set in accordance with the surrounding conditions.

Further, in the display device for a vehicle according to the second aspect, in a case in which the degree of urgency of the surrounding conditions is low, the display area of the information can be set by the display control unit to a first display area based on the surrounding conditions, and in a case in which the degree of urgency is high, the display area of the information can be set by the display control unit to a second display area, which is larger than the first display area.

The display device for a vehicle according to a third aspect is the display device for a vehicle according to the first aspect or the second aspect, wherein, while the vehicle is unlocked, the display unit is configured to at least display a predetermined word as the information or irradiate a predetermined light from the display surface.

According to the display device for a vehicle according to the third aspect, while the vehicle is unlocked, at least one of displaying a predetermined word or irradiating a predetermined light is carried out at the display surface of the display unit. Therefore, when the occupant gets in the vehicle, for example, the schedule of the occupant can be displayed at the display unit and the display unit can be used as a welcome light.

The display device for a vehicle according to a fourth aspect is the display device for a vehicle according to any one of the first aspect to the third aspect, wherein: the display unit is configured to change to a lighting mode in which the display surface functions as a light that illuminates the vehicle cabin of the vehicle; and changing to the lighting mode of the display unit, and at least one of setting a brightness of light emitted from the display surface or setting the exposed area, can be performed in response to an operation by the occupant.

According to the display device for a vehicle according to the fourth aspect, the display unit can change to a lighting mode in response to an operation by the occupant, and in the lighting mode, the display surface functions as a light that illuminates the vehicle cabin. Further, at least one of setting a brightness of light that is emitted from the display surface or setting the exposed area of the display surface can be performed in response to an operation by the occupant. Therefore, it is possible to ensure a light source around the display unit in the vehicle cabin and to adjust the illuminating light, without separately providing lighting around the display unit.

The display device for a vehicle according to a fifth aspect is the display device for a vehicle according to any one of the first aspect to the fourth aspect, further including an in-vehicle camera that is configured to image the vehicle occupant, wherein: the display unit is configured to change to a mirror mode that displays an image of the occupant, imaged by the in-vehicle camera, at the display surface; and changing to the mirror mode of the display unit and setting the exposed area can be performed in response to an operation by the occupant.

According to the display device for a vehicle according to the fifth aspect, an in-vehicle camera is provided, and the occupant is imaged by the in-vehicle camera. Further, the display unit can change to a mirror mode in response to an operation by the occupant, and in the mirror mode, an image of the occupant, imaged by the in-vehicle camera, is displayed at the display surface. Therefore, the display surface of the display unit can be used as a mirror.

Further, in the display device for a vehicle according to the fifth aspect, the exposed area of the display surface can be set in response to an operation by the occupant, and as a result, a mirror image of the occupant can be displayed at the display surface to the extent required by the occupant.

The display device for a vehicle according to a sixth aspect is the display device for a vehicle according to the fifth aspect, wherein, in a state in which the display unit is in the mirror mode, a peripheral edge portion of the display surface is set as a light emitting portion that emits white light.

According to the display device for a vehicle according to the sixth aspect, in a state in which the display unit is in the mirror mode, a peripheral edge portion of the display surface is set as a light emitting portion, and white light is irradiated from the light emitting portion. Therefore, in the mirror mode, the peripheral edge portion of the display surface can be made to function as a mirror light.

The display device for a vehicle according to a seventh aspect is the display device for a vehicle according to any one of the first aspect to the sixth aspect, wherein the display unit includes an organic electroluminescent element and is film-shaped.

According to the display device for a vehicle according to the seventh aspect, the display unit includes an organic electroluminescent element and is film-shaped, and when the display unit is stored, the display unit can be bent and deformed.

The display device for a vehicle according to an eighth aspect is the display device for a vehicle according to any one of the first aspect to the seventh aspect, further including an automatic driving control unit that controls automatic driving of the vehicle, wherein: during automatic driving of the vehicle or during parking of the vehicle, the display control unit is configured to display the information at an entirety of the display surface; and during manual driving of the vehicle, the drive control unit controls a drive amount of the drive unit such that the display unit is positioned outside a predetermined range, which is in a field of view of the occupant, in a vehicle up-down direction, and the display control unit sets the display area based on the exposed area.

According to the display device for a vehicle according to the eighth aspect, an automatic driving control unit is provided, and automatic driving of the vehicle is controlled by the automatic driving control unit. Further during automatic driving of the vehicle or during parking of the vehicle, the display control unit can display information at an entirety of the display surface. Therefore, it is possible to ensure the area of the display surface which is visible to the occupant during automatic driving of the vehicle and during parking of the vehicle.

On the other hand, during manual driving of the vehicle, the drive control unit controls a drive amount of the drive unit such that the display unit is positioned outside a predetermined range, which is in a field of view of the occupant, in the vehicle up-down direction. As a result, the exposed area of the display surface is limited as compared with a case in which the vehicle is being automatically driven or the vehicle is being parked. Further, the display control unit sets the display area based on the exposed area of the display surface.

Therefore, various information can be displayed to the occupant via the display surface while suppressing the display surface from obstructing the field of view of the occupant during manual driving of the vehicle.

The display device for a vehicle according to a ninth aspect is the display device for a vehicle according to the eighth aspect, further including a vehicle location detection element that is configured to detect a location of the vehicle, wherein: the drive control unit is configured to control the drive amount in accordance with the predetermined range, which is set to a country or region in which the vehicle is located, as detected by the vehicle location detection element.

According to the display device for a vehicle according to the ninth aspect, a vehicle location detection element is provided, and a location of the vehicle can be detected by the vehicle location detection element. The drive control unit controls the drive amount of the drive unit in accordance with the predetermined range, which is set to a country or region in which the vehicle is located, as detected by the vehicle location detection element, that is, a predetermined range which is in the field of view of the occupant, in the vehicle up-down direction.

Therefore, during manual driving of the vehicle, the position of the display unit can be set so as to comply with the laws and regulations of the country or region in which the vehicle is located.

Effects of the Invention

As described above, the display device for a vehicle according to the first aspect has the excellent effect of being able to appropriately display information to the occupant without changing the display unit that displays the information to the occupant, in accordance with the amount of information.

The display device for a vehicle according to the second aspect has the excellent effect that the occupant can understand the degree of urgency of the surrounding conditions of the vehicle due to the size of the display surface of the display unit.

The display device for a vehicle according to the third aspect has the excellent effect that the convenience for the occupant at the time of getting in the vehicle can be enhanced.

The display device for a vehicle according to the fourth aspect has the excellent effect that an information display function and a lighting function are integrated at the display unit, and the configuration of the vehicle cabin can be simplified.

The display device for a vehicle according to the fifth aspect has the excellent effect that a mirror image of the occupant can be displayed at a position that is visible to the occupant without installing a mirror in the vehicle cabin.

The display device for a vehicle according to the sixth aspect has the excellent effect that the mirror image of the occupant displayed at the display surface can be made clearer.

The display device for a vehicle according to the seventh aspect has the excellent effect that the expansion of the space required for storing the display unit can be suppressed as compared with a configuration in which a liquid crystal display is adopted as the display unit.

The display device for a vehicle according to the eighth aspect has the excellent effect that information can be appropriately displayed to the occupant while ensuring the field of view of the occupant during manual driving.

The display device for a vehicle according to the ninth aspect has the excellent effect that the field of view of the occupant during manual driving can be ensured in accordance with the laws and regulations of a predetermined country or region.

BRIEF DESCRIPTION OF THE DRAWINGS

Exemplary embodiments of the present disclosure will be described in detail based on the following figures, wherein:

FIG. 18 is a block diagram showing a relationship between devices installed at a vehicle provided with the display device for a vehicle according to the fourth embodiment.

DETAILED DESCRIPTION

First Embodiment

Figure 1:
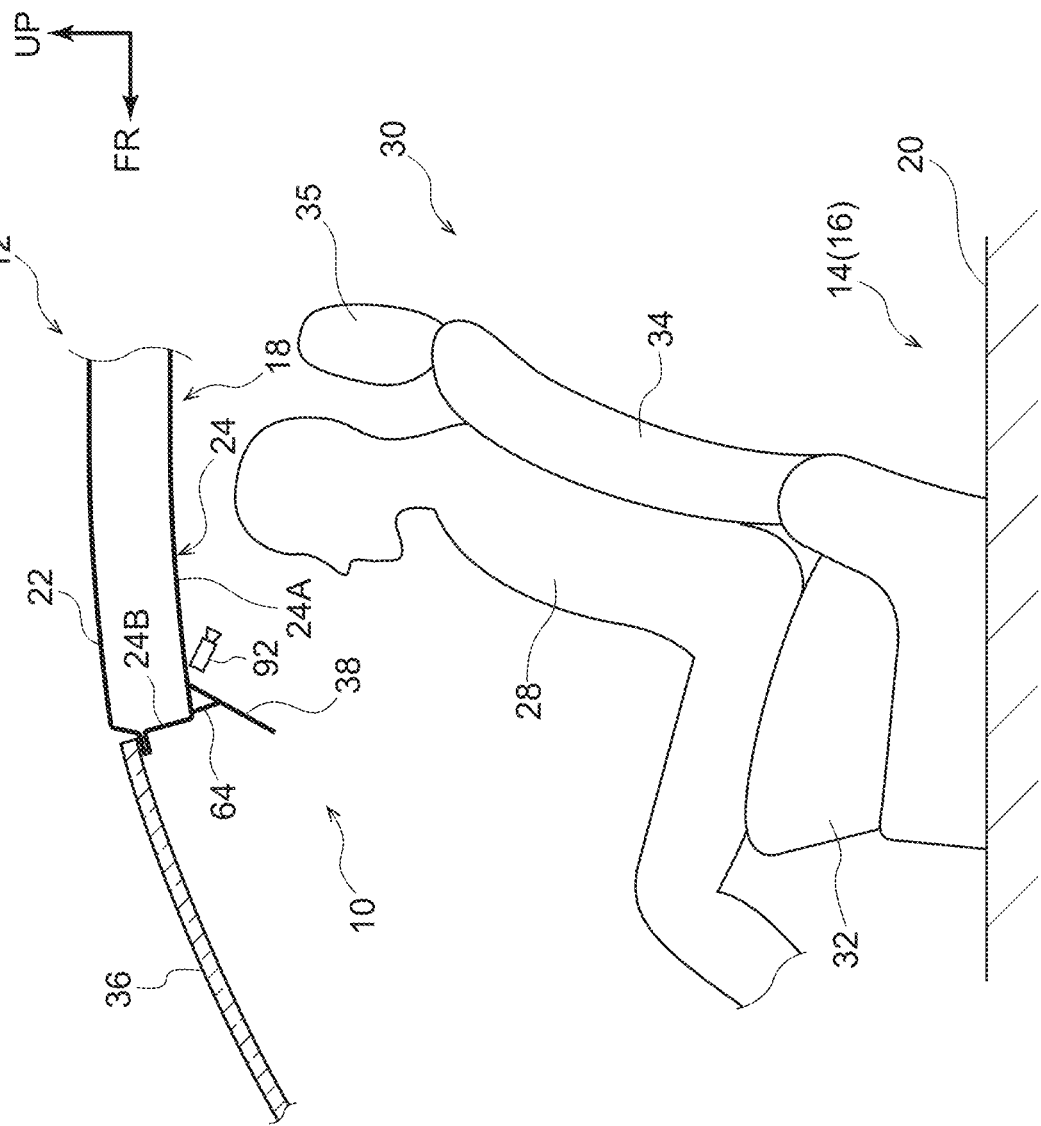
FIG. 1 is a side view schematically showing a configuration of a vehicle provided with a display device for a vehicle according to a first embodiment.

Explanation follows regarding the first embodiment of the display device for a vehicle according to the present disclosure, with reference to FIG. 1 to FIG. 13. The arrow FR appropriately shown in each drawing indicates a vehicle front side of a vehicle 12 at which a display device for a vehicle 10 according to the present embodiment is installed, and the arrow UP indicates a vehicle upper side of the vehicle 12.

First, the schematic configuration of the vehicle 12 will be described with reference to FIG. 1. The vehicle 12 includes a vehicle body 16 that constitutes the main part of the vehicle cabin 14, and a vehicle upper side portion of the vehicle body 16 is configured by a roof portion 18 and a vehicle lower side portion of the vehicle body 16 is configured by a floor portion 20.

Figure 2:
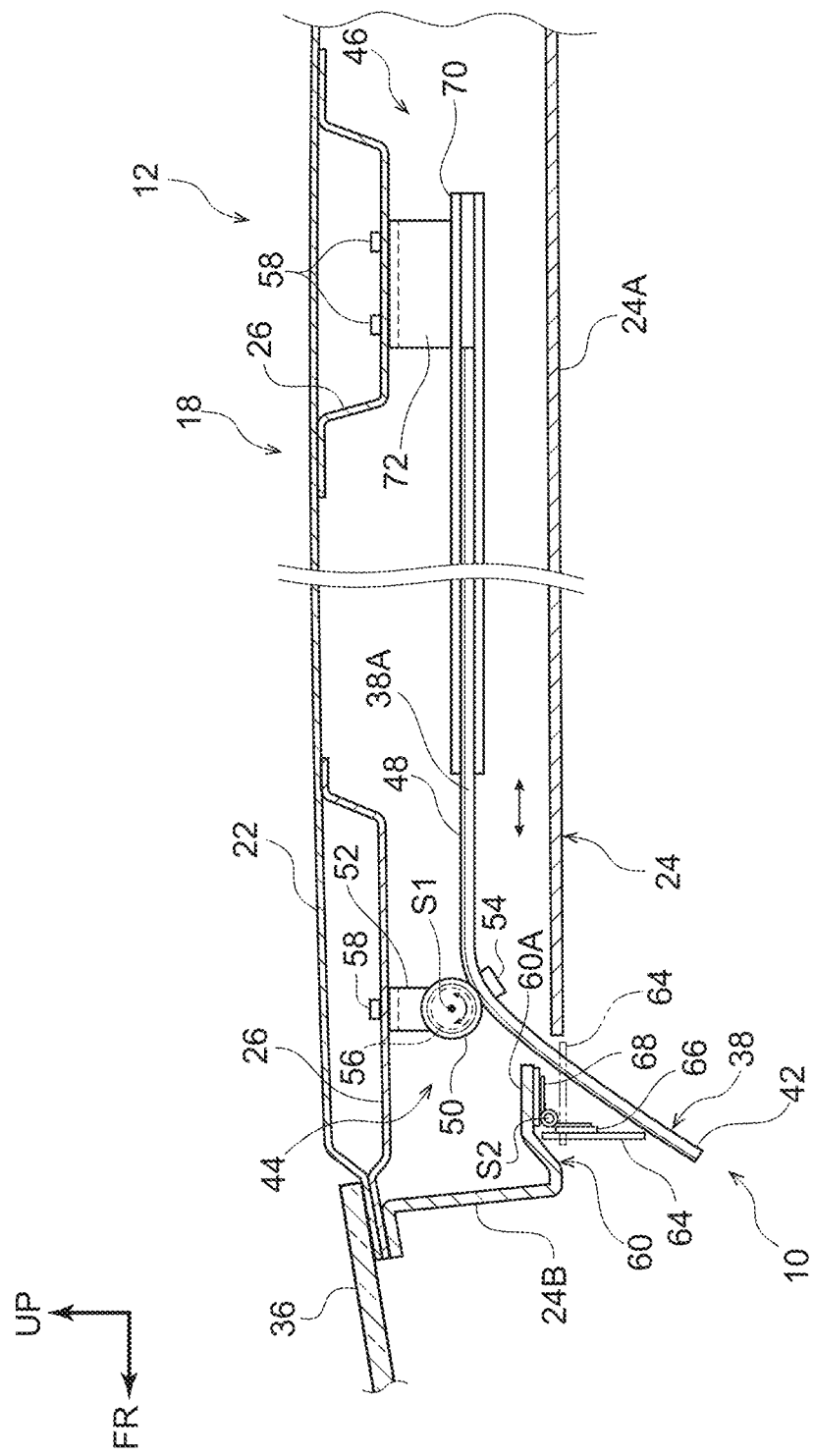
FIG. 2 is a cross section view, as seen in a vehicle width direction, schematically showing a configuration of a vehicle equipped with the display device for a vehicle according to the first embodiment.

The roof portion 18 extends in a vehicle front-rear direction and the vehicle width direction and includes a roof panel 22 that configures a part of the design surface of the vehicle 12, and the roof panel 22 is covered from the vehicle lower side by a roof trim 24 as an interior member. As shown in FIG. 2, the roof trim 24 configures a ceiling surface of the vehicle cabin 14, and includes a ceiling surface portion 24A that extends in the vehicle front-rear direction and the vehicle width direction, and a front wall portion 24B that extends from a vehicle front side peripheral edge portion of the ceiling surface portion 24A to the vehicle upper side.

As shown in FIG. 2, the roof panel 22 is reinforced by plural roof reinforcements 26 that are disposed with spaces therebetween in the vehicle front-rear direction. The roof reinforcements 26 extend in the vehicle width direction and, together with the roof panel 22, configure a closed cross-section structure having a closed cross-section as viewed in the vehicle width direction. The roof reinforcement 26 located closest to the vehicle front side is disposed along a vehicle front side peripheral edge portion of the roof panel 22. The roof trim 24 is attached to the roof reinforcements 26 by an attachment member such as a fastener (not shown).

Returning to FIG. 1, a seat 30, in which an occupant 28 sits, is disposed at the floor portion 20. The seat 30 includes a seat cushion 32, a seat back 34, and a headrest 35. Further, a lower end portion of the seat back 34 is rotatable with respect to a rear end portion of the seat cushion 32.

A front windshield 36 is disposed at the front side of the seat 30, that is, at the vehicle front side of the vehicle body 16. The front windshield 36 is configured from a transparent glass plate, and extends from a vehicle front side peripheral edge portion of the roof portion 18 to the vehicle front lower side, as viewed in the vehicle width direction.

A resin instrument panel 156 (see FIG. 14) is disposed at the vehicle lower side of the front windshield 36 as an interior member. The instrument panel 156 covers a Heating Ventilation and Air Conditioning (HVAC) unit (not shown) from the vehicle rear side.

Here, in the present embodiment, as shown in FIG. 2, a first feature is that a display 38 is disposed between the roof panel 22 and the roof trim 24 as a display unit that configures a part of the display device for a vehicle 10. Further, a second feature is that a control device 40, which configures a part of the display device for a vehicle 10 shown in FIG. 3, enables various control of the display device for a vehicle 10. Detailed explanation follows regarding the configuration of the display device for a vehicle 10 with a focus on the configurations of the display 38 and the control device 40.

Figure 5:
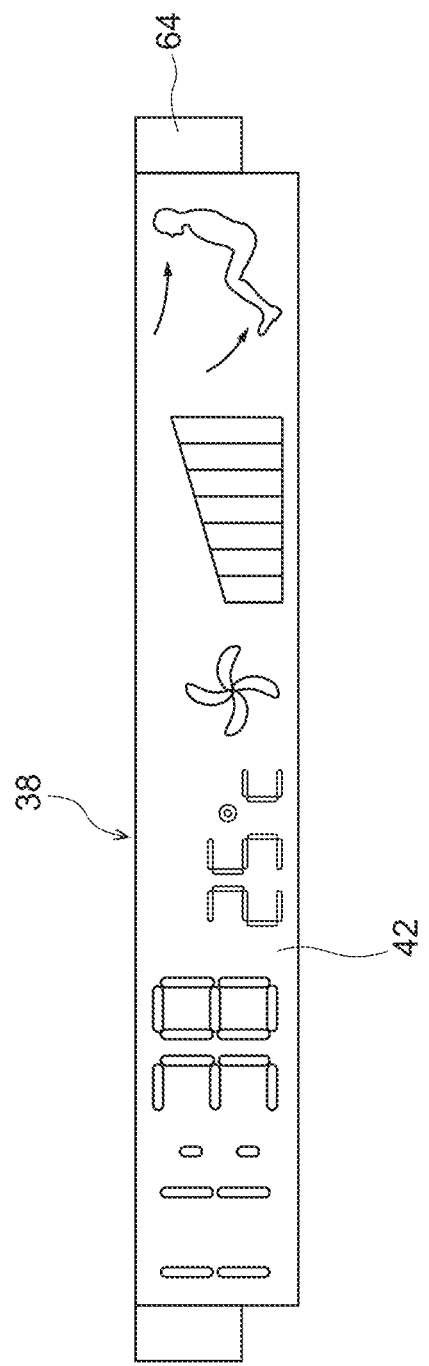
FIG. 5 is a front view showing a display example, at a normal time, at a display unit of the display device for a vehicle according to the first embodiment.

The display 38 is provided with an organic electroluminescent element and has a rectangular film shape in plan view, and as shown in FIG. 5 and the like, the display 38 is provided with a display surface 42 that is capable of displaying information to the occupant 28. The display 38 is electrically connected to the control device 40 via wiring (not shown), and by being driven by a signal that is output from the control device 40, is capable of displaying various images and the like at the display surface 42 as described below. The display 38 is supported by a display drive unit 44, as a drive unit, and a display support unit 46, with respect to the vehicle body 16.

Specifically, the display drive unit 44 includes a pair of racks 48, a pair of pinions 50, a pair of mounts 52, a pair of guides 54, a motor 56, and a motor driver (not shown). The racks 48 are configured from a flexible material, are disposed at respective vehicle width direction end portions 38A of the display 38, and are provided along the vehicle front-rear direction at the vehicle upper side of the end portions 38A. That is, the racks 48 can be regarded as configuring a part of the end portions 38A of the display 38.

Each of the pinions 50 is disposed relative to a respective end portion 38A of the display 38 and is engaged with a respective rack 48. Further, the pinion 50 at one side in the vehicle width direction is connected to an output shaft (not shown) of the motor 56, and by the motor 56 operating based on a control signal from the control device 40, the pinions 50 move rotationally around a rotation shaft S1 that extends in the vehicle width direction, and the display 38 can be moved in the vehicle front-rear direction. The motor 56 is supported by the mount 52 at one side in the vehicle width direction, and this mount 52 is fixed, by a fastening member (not shown), to a weld nut 58 that is provided at the roof reinforcement 26 located at the vehicle front most side.

The guides 54 are also attached to the mounts 52, and the display 38 is supported from the vehicle lower side by the guides 54. The shaft of the pinion 50 at the other side in the vehicle width direction is attached to the mount 52 at the other side in the vehicle width direction via a bearing (not shown). When the display 38 is sent out to the vehicle front side by rotational movement of the pinions 50, the display 38 is guided by the guides 54 such that a vehicle front side portion of the display 38 extends from the guides 54 to the vehicle lower front side.

On the other hand, a recess 60 that is recessed to the vehicle upper side is provided at the boundary between the ceiling surface portion 24A and the front wall portion 24B of the roof trim 24. A slit portion 62 through which the display 38 can be inserted is provided at the vehicle rear side portion of the recess 60, and the display 38 extends from the slit portion 62 to the outer side of the roof trim 24.

Further, a plate-shaped cover portion 64 that is capable of covering the recess 60 from the vehicle lower side is disposed at the vehicle lower side of the recess 60. The cover portion 64 is attached to an upper wall portion 60A, which configures a vehicle upper side portion of the recess 60, via a hinge 66. Further, at normal times, the cover portion 64 is held by a torsion spring 68, which is attached to the hinge 66, in a closed state in which the plate thickness direction of the cover portion 64 is the vehicle up-down direction. By being pressed by the display 38 extending from the slit portion 62, the cover 64 moves rotationally around a rotation shaft S2 of the hinge 66 that extends in the vehicle width direction, and becomes in an open state. Further, when the display 38 is stored from the slit portion 62, the cover portion 64 becomes in a closed state by the restoring force of the torsion spring 68.

On the other hand, the display support unit 46 can mainly support a vehicle rear side portion of the display 38, and includes a pair of guide rails 70 and a pair of rail mounts 72.

Each of the guide rails 70 is disposed relative to a respective end portion 38A of the display 38, extends in the vehicle front-rear direction, and has a U-shape in which the cross-sectional shape as viewed in the vehicle front-rear direction is open inward in the vehicle width direction. The end portions 38A of the display 38, including the racks 48, can be inserted into the guide rails 70, and the guide rails 70 can guide the display 38 in the vehicle front-rear direction. The guide rails 70 are attached to the roof reinforcement 26 located at a vehicle rear side with respect to the roof reinforcement 26 to which the mount 52 is fixed via the rail mounts 72. The rail mounts 72 are fixed to weld nuts 58 that are provided at the roof reinforcements 26 with fastening members (not shown).

Figure 3:
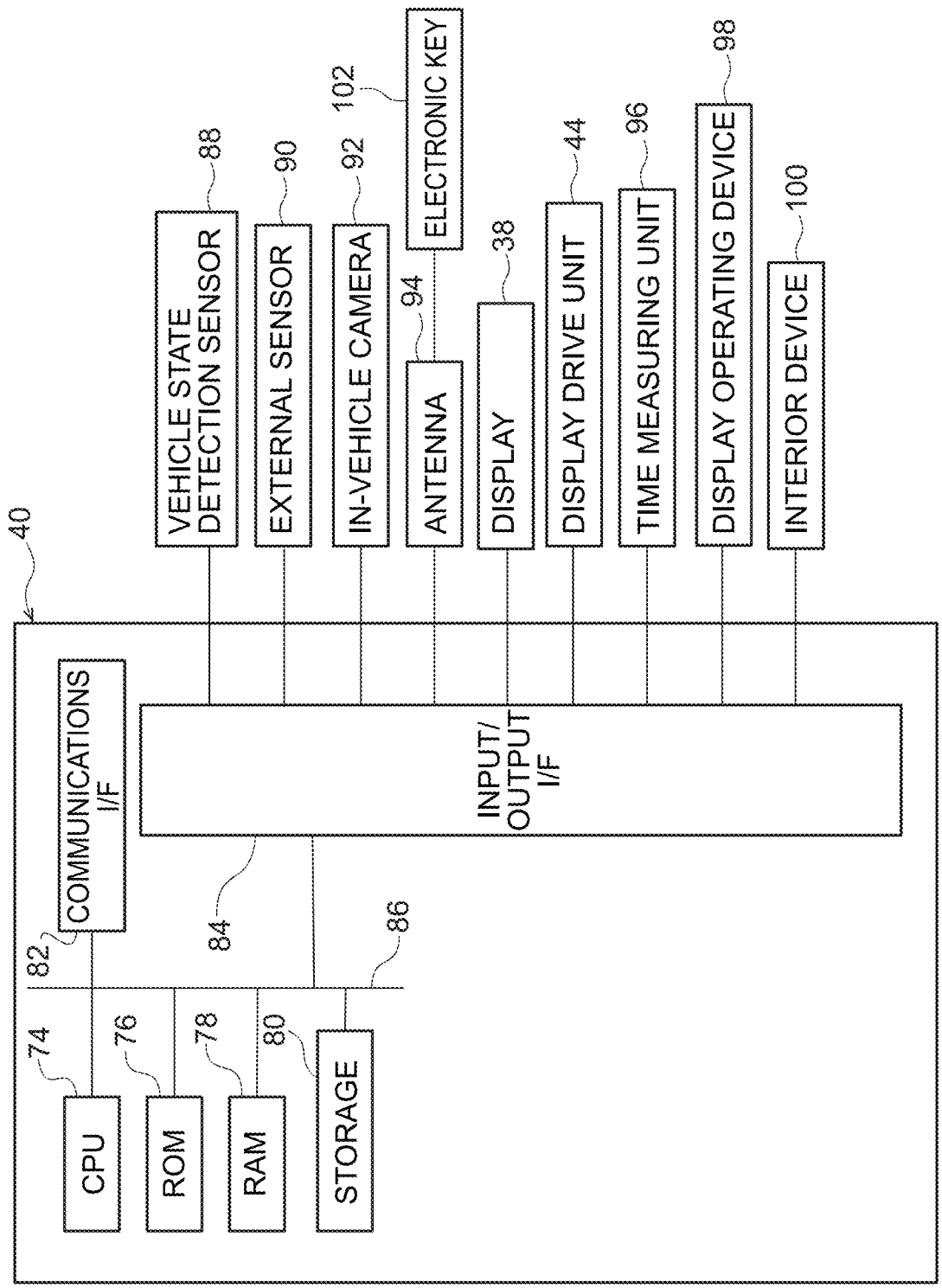
FIG. 3 is a block diagram showing a relationship between devices installed at a vehicle provided with the display device for a vehicle according to the first embodiment.

Next, the configuration of the control device 40 will be described with reference to FIG. 3. The control device 40 includes a central processing unit (CPU) 74, a read-only memory (ROM) 76, a random access memory (RAM) 78, a storage 80, a communications interface (I/F) 82, and an input/output I/F 84. The CPU 74, the ROM 76, the RAM 78, the storage 80, the communications I/F 82, and the input/output I/F 84 are communicably connected to each other via a bus 86.

The CPU 74 is a central processing unit that can control various devices by executing various programs. Specifically, the CPU 74 reads a program from the ROM 76 and can execute the program employing the RAM 78 as a work space. The execution program that is stored in the ROM 76 is read and executed at the CPU 74 such that the control device 40 can perform various functions as described below.

More specifically, the ROM 76 stores various programs and various data which relate to control of an image that is displayed at the display 38, control of the display drive unit 44 and the like. On the other hand, the RAM 78 can temporarily store a program or data as a work space.

The storage 80 includes a hard disk drive (HDD) or a solid state drive (SSD), and can store various programs and various data, including an operating system.

The communications I/F 82 is an interface that is used to connect the control device 40 and various networks, and is capable of communicating with a server or the like (not shown). For the interface, for example, a communications standard such as Ethernet (registered trademark), FDDI, and Wi-Fi (registered trademark) is used. Further, the communications I/F 82 may include a wireless device.

The input/output I/F 84 is an interface for the control device 40 to communicate with various devices installed at the vehicle 12. The control device 40 is communicably connected to each device described below via the input/output I/F 84.

The devices connected to the control device 40 include a vehicle state detection sensor 88, an external sensor 90, an in-vehicle camera 92, an antenna 94, the display 38 described above, the display drive unit 44 described above, a time measuring unit 96, a display operating device 98, an interior device 100 and the like.

The vehicle state detection sensor 88 is a group of sensors used to detect an abnormality in the vehicle cabin 14. The vehicle state detection sensor 88 includes, for example, a door open/closed sensor (not shown) that detects an open/closed state of a door of the vehicle 12, and a seatbelt sensor (not shown) that detects a fastening state of a seatbelt. In a case in which an abnormality in the vehicle cabin 14 is detected by the vehicle state detection sensor 88, an abnormality signal that indicates an abnormality in the vehicle cabin 14 is output from the vehicle state detection sensor 88 to the control device 40.

The external sensor 90 is a group of sensors used to detect the surrounding conditions of the vehicle 12. The external sensor 90 includes, for example, a camera that images a predetermined range, a millimeter-wave radar that transmits a search wave across a predetermined range, and a laser imaging detection and ranging (LIDAR) scanner that scans a predetermined range. The data acquired by the external sensor 90 is transmitted to the control device 40 and temporarily stored in the storage 80.

As shown in FIG. 1, the in-vehicle camera 92 is disposed in the vehicle cabin 14 at a position where the face of the occupant 28 can be imaged. The image data acquired by the in-vehicle camera 92 is transmitted to the control device 40 and temporarily stored in the storage 80.

Returning to FIG. 3, the antenna 94 can be used to detect a portable device 102 (not shown) such as an electronic key which is carried by the occupant 28. Specifically, the antenna 94 is capable of transmitting a request signal within a predetermined range centered on the antenna 94. On the other hand, when the portable device 102 receives the request signal, the portable device 102 can transmit a response signal, which includes a key ID, to the antenna 94. In a case in which the antenna 94 receives the response signal from the portable device 102, the antenna 94 outputs, to the control device 40, a detection signal that indicates the detection of the portable device 102.

The display 38 is described below, but based on the control of the control device 40, a warning that indicates an abnormality inside the vehicle cabin 14, a warning that indicates an abnormality outside the vehicle 12, an image of the outside of the vehicle 12, standard information such as the time, an image of the occupant 28, and a predetermined word can be displayed.

The display drive unit 44 is driven based on the control of the control device 40 to drive the display 38, and an exposed area, which is exposed from the roof trim 24, at the display surface 42 of the display 38 can be adjusted.

The time measuring unit 96 measures the time and can output a signal based on the time to the control device 40. The time measuring unit 96 is provided with an antenna that is capable of receiving a standard radio wave, and may be configured to be able to correct the time based on a standard radio wave.

The display operating device 98 is capable of changing the display 38 to a standard information display mode, a lighting mode, and a mirror mode, which are described below, by converting the input in response to an operation of the occupant 28 into a signal and inputting the signal to the control device 40. Further, in each of the aforementioned modes, the display operating device 98 can reflect an operation by the occupant 28 at the display 38, and for example, the exposed area of the display surface 42 of the display 38 can be adjusted.

The interior device 100 is a group of devices disposed in the vehicle cabin 14. The interior device 100 includes, for example, the above-mentioned HVAC unit and an audio device. Further, data that is related to the setting of the interior device 100, such as the set temperature of the air conditioning and the set volume of the audio device, is transmitted to the control device 40 and temporarily stored in the storage 80.

Next, the functional configuration of the control device 40 is described with reference to FIG. 4. The CPU 74 reads the execution program that is stored in the ROM 76, and by the CPU 74 executing the execution program, the control device 40 functions as a collective of a mode switching control unit 104, a lighting control unit 106, a standard information display control unit 108 as a display control unit, a setting information display control unit 110, a mirror display control unit 112, a warning display control unit 114, and a display drive control unit 116 as a drive control unit.

The mode switching control unit 104 can switch the display 38 to any one of the lighting mode, the standard information display mode, and the mirror mode in response to the input of the occupant 28 to the display operating device 98.

When the display 38 is changed to the lighting mode by the mode switching control unit 104, the lighting control unit 106 causes the display 38 to function as lighting that can be operated by the display operating device 98. Specifically, the lighting control unit 106 can adjust the exposed area of the display surface 42 by controlling the display drive unit 44 in response to the input of the occupant 28 to the display operating device 98. The lighting control unit 106 controls the display 38 and can cause light to be emitted from an exposed portion at the display surface 42. Further, the lighting control unit 106 can set the brightness of the light that is emitted from the display surface 42 in response to the input of the occupant 28 to the display operating device 98.

The standard information display control unit 108 displays standard information at the display surface 42 in a state in which the display 38 has changed to the standard information display mode by the mode switching control unit 104. Specifically, based on the time acquired from the time measuring unit 96, a setting of each device acquired from the interior device 100 and the like, the standard information display control unit 108 sets the standard information that is displayed at the display surface 42 and a display area that displays the standard information, and displays the standard information at the display surface 42 as shown in FIG. 5.

The standard information that is displayed at the display surface 42 may be set to predetermined standard information, or may be set by operation of the display operating device 98 by the occupant 28. Further, in the present embodiment, as an example, when a predetermined signal that indicates that a state in which the display 38 is in the standard information display mode is set to the normal state of the display 38 and that an ignition switch (not shown) is in the ON position is input to the control device 40, the display 38 is set to the standard information display mode. On the other hand, when a predetermined signal that indicates that the ignition switch is in the OFF position is input to the control device 40, the entirety of the display 38 is stored in the storage position.

In response to setting information that is input by the occupant 28 at the display operating device 98, a time at which the setting information is displayed and the like, the setting information display control unit 110 sets the setting information that is displayed at the display surface 42, the display area that displays the setting information, and the time at which the setting information is displayed, and displays the setting information at the display surface 42 as shown in FIG. 5.

Further, the setting information display control unit 110 is set to display the setting information at the display surface 42 for a predetermined period of time when the detection signal is input from the antenna 94, that is, when the occupant 28 approaches the predetermined range of the antenna 94.

Figure 6:
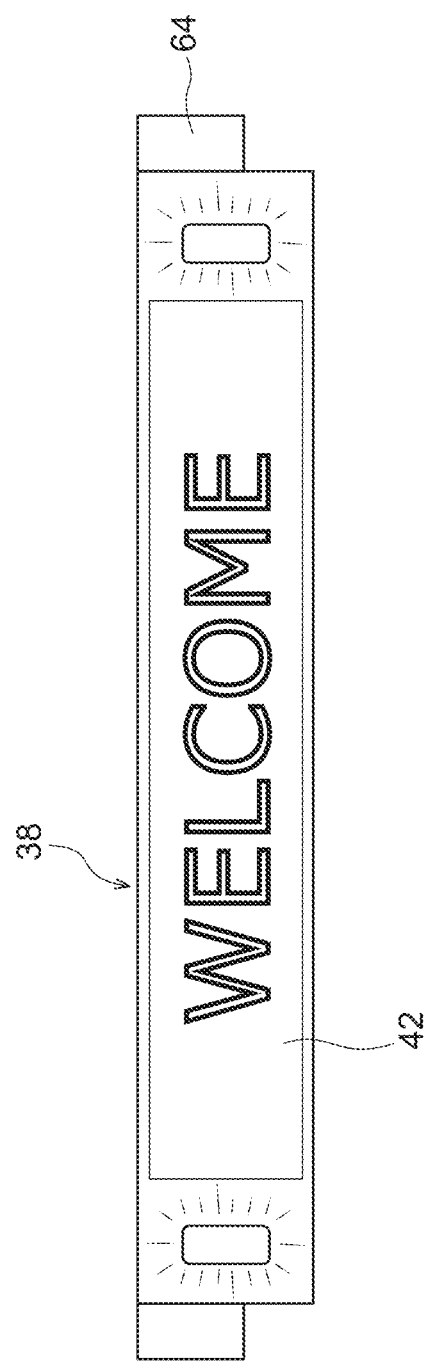
FIG. 6 is a front view showing a display example, when the occupant gets in the vehicle, at the display unit of the display device for a vehicle according to the first embodiment.

In the present embodiment, as an example, it is set such that when the occupant 28 gets in the vehicle 12, "WELCOME" is displayed at the display surface 42, and a portion at each side in the vehicle width direction of the displayed word emit light as shown in FIG. 6. Further, it may be set such that when the occupant 28 gets in the vehicle 12 for the first time on the birthday of the occupant 28, "HAPPY BIRTHDAY" is displayed at the display surface 42. Furthermore, it may be set such that when the occupant 28 gets in the vehicle 12, the schedule of the occupant 28 that has been input at the display operating device 98 is displayed at the display surface 42. In addition, in a case in which the setting information to be displayed to the occupant 28 is not set, the setting information display control unit 110 causes the display surface 42 to emit light when the occupant 28 gets in the vehicle, and the display 38 can be made to function as a welcome light.

Figure 7:
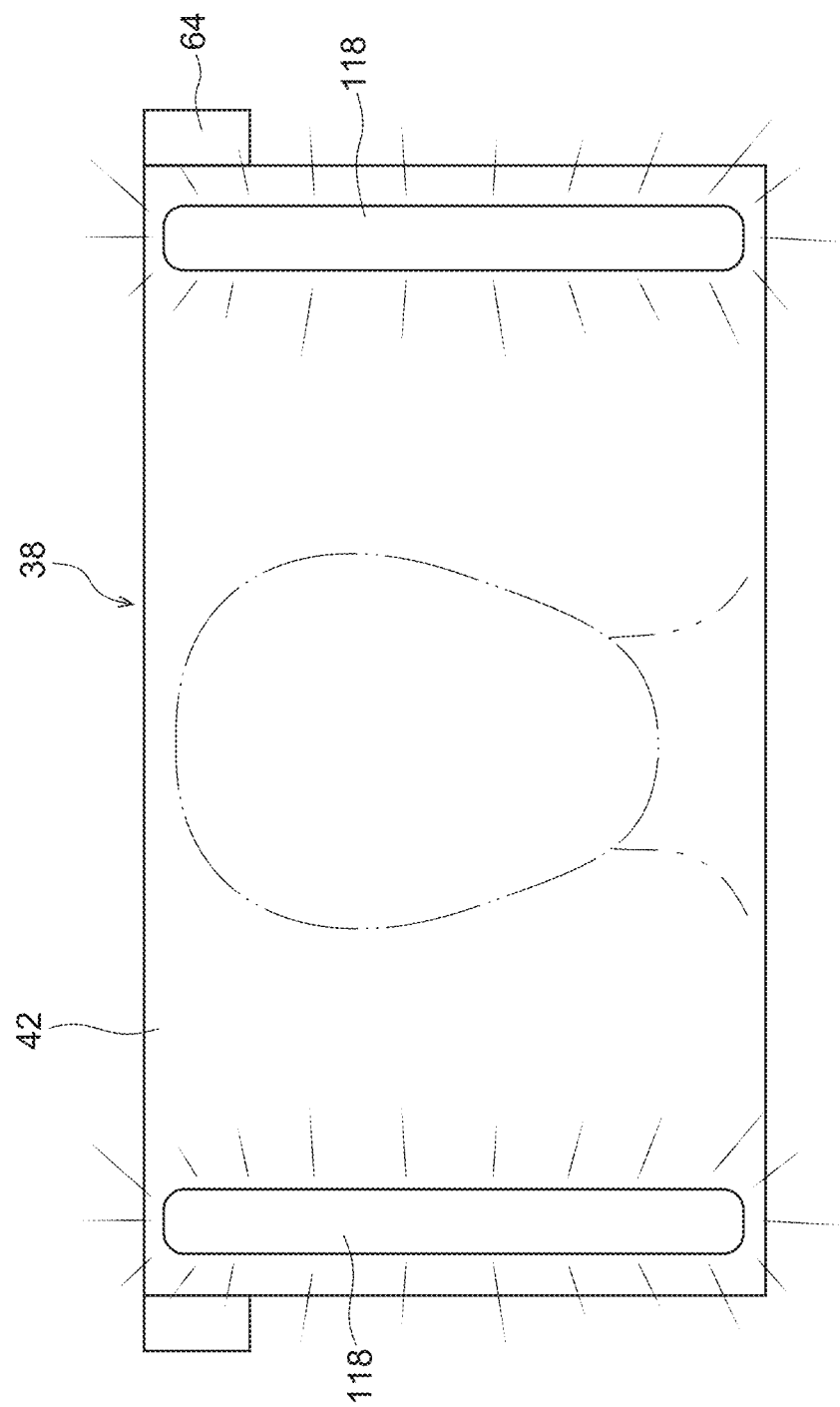
FIG. 7 is a front view showing a display example of a mirror mode at the display unit of the display device for a vehicle according to the first embodiment.

The mirror display control unit 112 causes the display surface 42 to function as a mirror in a state in which the display 38 is has changed to the mirror mode by the mode switching control unit 104. Specifically, based on the image data of the occupant 28 which is acquired by the in-vehicle camera 92, the mirror display control unit 112 displays a mirror image of the occupant 28 at the display surface 42 as shown in FIG. 7. Further, in the present embodiment, as an example, in a state in which the display 38 has changed to the mirror mode, both vehicle width direction outer side portions of a peripheral edge portion of the display surface 42 are set to light emitting portions 118, which emit white light. The light emitting portions 118 may be set to the entire peripheral edge portion of the display surface 42, or may be set to both vehicle up-down direction sides of the peripheral edge portion.

Further, the mirror control unit 112 can adjust the exposed area of the display surface 42 by controlling the display drive unit 44 in response to the input of the occupant 28 to the display operating device 98.

Figure 8:
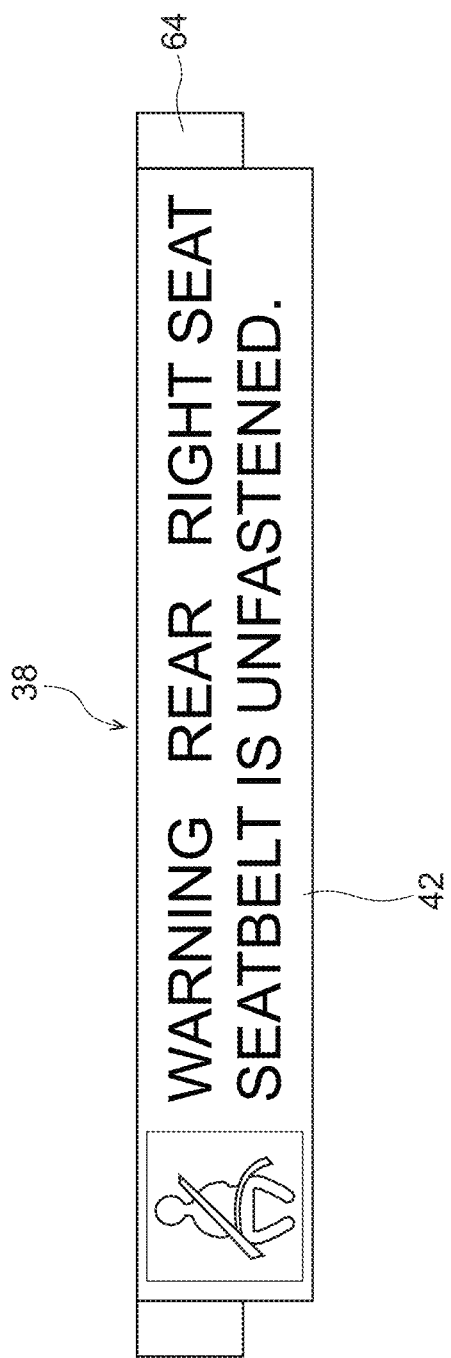
FIG. 8 is a front view showing a display example of a warning at the display unit of the display device for a vehicle according to the first embodiment.

The warning display control unit 114 displays a warning at the display surface 42 based on the data that is acquired from the vehicle state detection sensor 88 and the external sensor 90. Specifically, when an abnormality signal is input from the door open/closed sensor or the seat belt sensor, the warning display control unit 114 sets a warning that is displayed at the display surface 42 based on the abnormality signal and a display area that displays the warning, and the warning is displayed at the display surface 42 as shown in FIG. 8 until the abnormality signal is not input.

Figure 9:
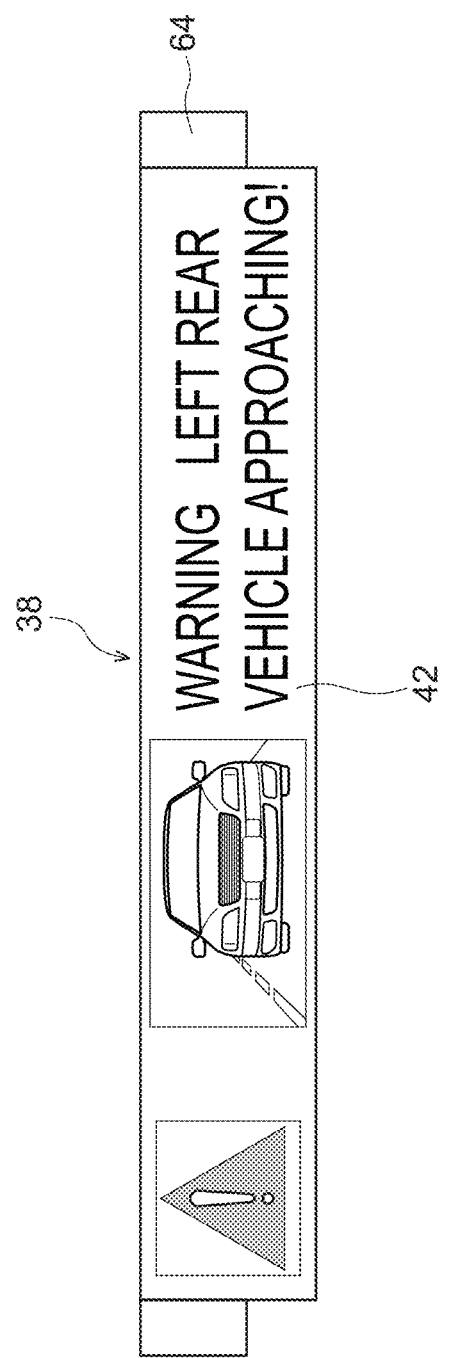
FIG. 9 is a front view showing a display example of surrounding conditions at a time at which a degree of urgency is low, at the display unit of the display device for a vehicle according to the first embodiment.

Further, the warning display control unit 114 determines whether or not there is an object approaching the vehicle 12, for example, a following vehicle approaching the vehicle 12, based on the data acquired from the external sensor 90, while the vehicle 12 is moving. In a case in which the warning display control unit 114 determines that there is an object having a tendency to approach the vehicle 12, as shown in FIG. 9, about a quarter of the display surface 42 is set as a first display area, and a warning providing notification of the object and of approach of the object is displayed at the display surface 42.

Figure 10:
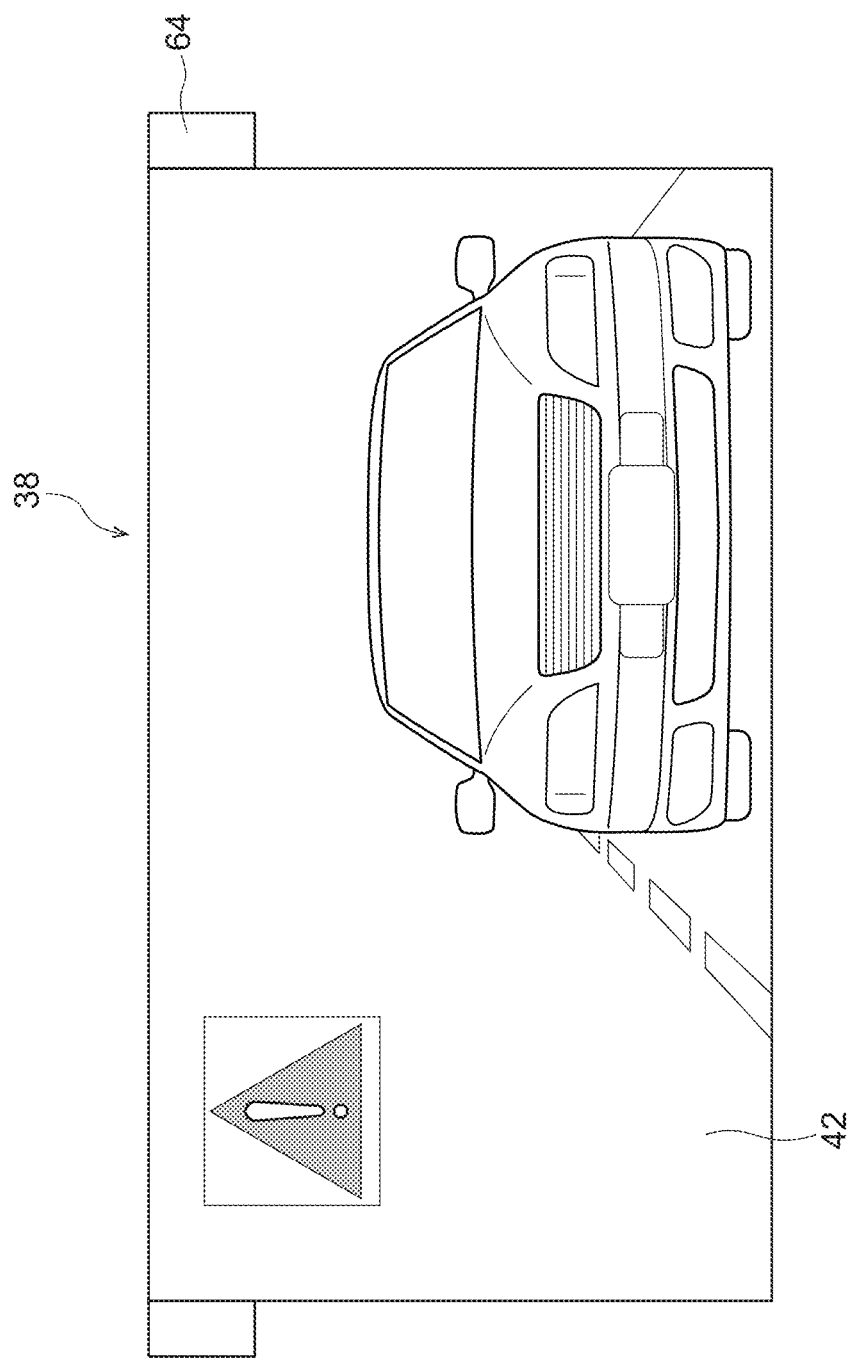
FIG. 10 is a front view showing a display example of surrounding conditions at a time at which a degree of urgency is high, at the display unit of the display device for a vehicle according to the first embodiment.

On the other hand, in a case in which the warning display control unit 114 determines that there is an object that has a high possibility of colliding with the vehicle 12, as shown in FIG. 10, the entirety (entire surface) of the display surface 42 is set as a second display area, and a warning providing notification of the object and of a collision with the object is displayed at the display surface 42. That is, in the present embodiment, the display area of the display surface 42 is set according to a degree of urgency of the surrounding conditions of the vehicle 12 which is moving.

The display drive control unit 116 sets a drive amount of the motor 56 of the display drive unit 44 such that the exposed area of the display surface 42 and the display area of the display surface 42, which is set at the standard information display control unit 108, the setting information display control unit 110, and the warning display control unit 114 described above, are proportional to each other. The display drive control unit 116 can control the display drive unit 44 such that the aforementioned display area and exposed area of the display surface 42 are proportional to each other by transmitting, to the display drive unit 44, a control signal that is based on this drive amount.

Operation and Effects of the Present Embodiment

Next, the operation and effects of the present embodiment will be described.

In the present embodiment, as shown in FIG. 1, a display 38 is provided, and as shown in FIG. 5 and the like, various information can be displayed to the occupant 28 of the vehicle 12 at the display surface 42 of the display 38. The information that is displayed at the display surface 42 and the display area in which the information is displayed at the display surface 42 are set at the standard information display control unit 108, the setting information display control unit 110, and the warning display control unit 114.

Incidentally, from the viewpoint of effective use of the display surface 42 of the display 38, in a case in which the display area in which information is displayed is small, it is preferable that the area of the display surface 42 which is visible to the occupant 28 is small, and in a case in which the display area is large, it is preferable that the area of the display surface 42 which is visible to the occupant 28 is large. In consideration of this, although it is conceivable to install plural display units having different display surface sizes, in such a configuration, it is necessary to appropriately change the display unit at which information is displayed in accordance with the amount of information that is displayed to the occupant 28.

Here, in the present embodiment, as shown in FIG. 2, the display 38 can be moved in and out of the roof trim 24 that is disposed in the vehicle cabin 14 by driving the display driving unit 44. Further, the exposed area, which is exposed from the roof trim 24, at the display surface 42 and the display area in which information is displayed are made to be proportional to each other by the display drive unit 44 being controlled by the display drive control unit 116.

Therefore, in the present embodiment, in one display 38, in a case in which the display area in which information is displayed is small, the area of the display surface 42 which is visible to the occupant 28 can be reduced, and in a case in which the display area in which information is displayed is large, the area of the display surface 42 which is visible to the occupant 28 can be increased. That is, in the present embodiment, the area of the display surface 42 which is visible to the occupant 28 in one display 38 can be set in accordance with the display area in which information is displayed. Therefore, in the present embodiment, it is possible to appropriately display information to the occupant 28 without changing the display 38 that displays information to the occupant 28, in accordance with the amount of information.

Further, in the present embodiment, the surrounding conditions of the vehicle 12 are acquired by the external sensor 90 while the vehicle 12 is moving. The warning display control unit 114 can set the information that is displayed at the display surface 42 and the display area in which the information is displayed based on a signal from the external sensor 90. Therefore, in the present embodiment, information based on the surrounding conditions of the vehicle 12 can be displayed at the display surface 42, and the display area of the information can be set in accordance with the surrounding conditions.

In the present embodiment, in a case in which the degree of urgency of the surrounding conditions is low, as shown in FIG. 9, the warning display control unit 114 can set the display area of the information to the first display area based on the surrounding conditions, and in a case in which the degree of urgency of the surrounding conditions is high, the warning display control unit 114 can set the display area to a second display area that is larger than the first display area, as shown in FIG. 10. Therefore, in the present embodiment, the occupant 28 can understand the degree of urgency of the surrounding conditions of the vehicle 12 by the size of the display surface 42 of the display 38.

Further, according to the present embodiment, as shown in FIG. 6, while the vehicle 12 is unlocked, at least one of displaying a predetermined word or irradiating a predetermined lighting is carried out at the display surface 42 of the display 38. Therefore, in the present embodiment, when the occupant 28 gets in the vehicle 12, for example, the schedule of the occupant 28 can be displayed at the display 38 and the display 38 can be used as a welcome light. Therefore, in the present embodiment, the convenience for when the occupant 28 gets in the vehicle can be enhanced.

Figure 11:
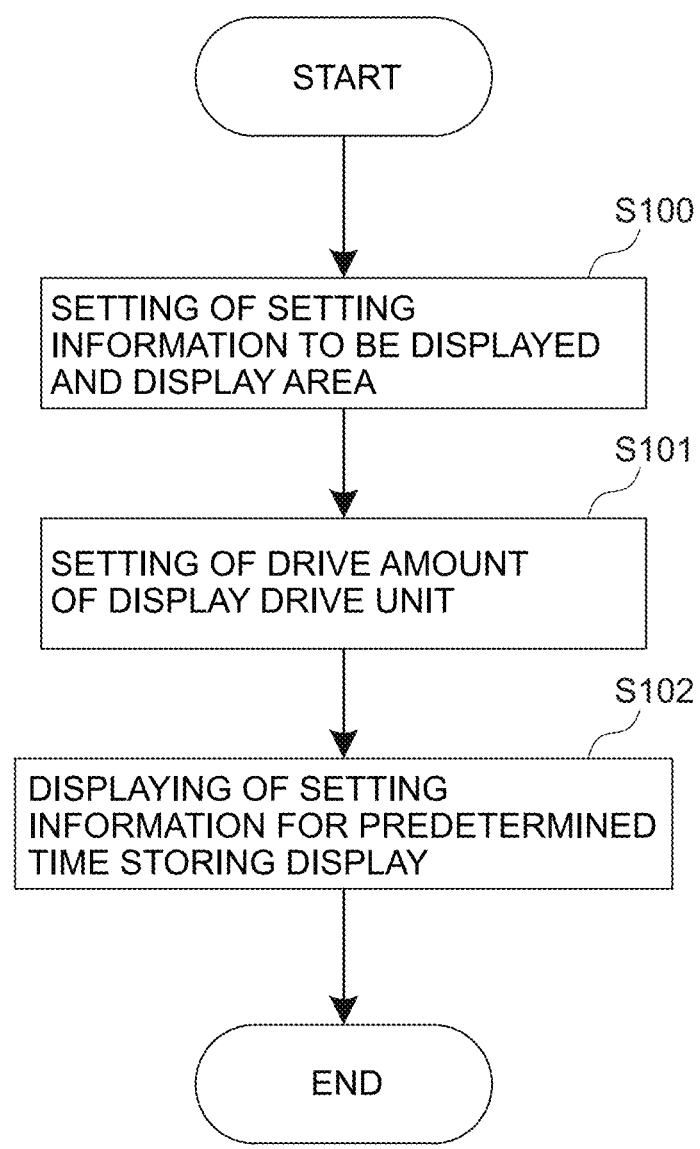
FIG. 11 is a flowchart showing an example of processing performed, at a time at which an occupant gets in a vehicle, by a control device installed at a vehicle provided with the display device for a vehicle according to the first embodiment.
Figure 12:
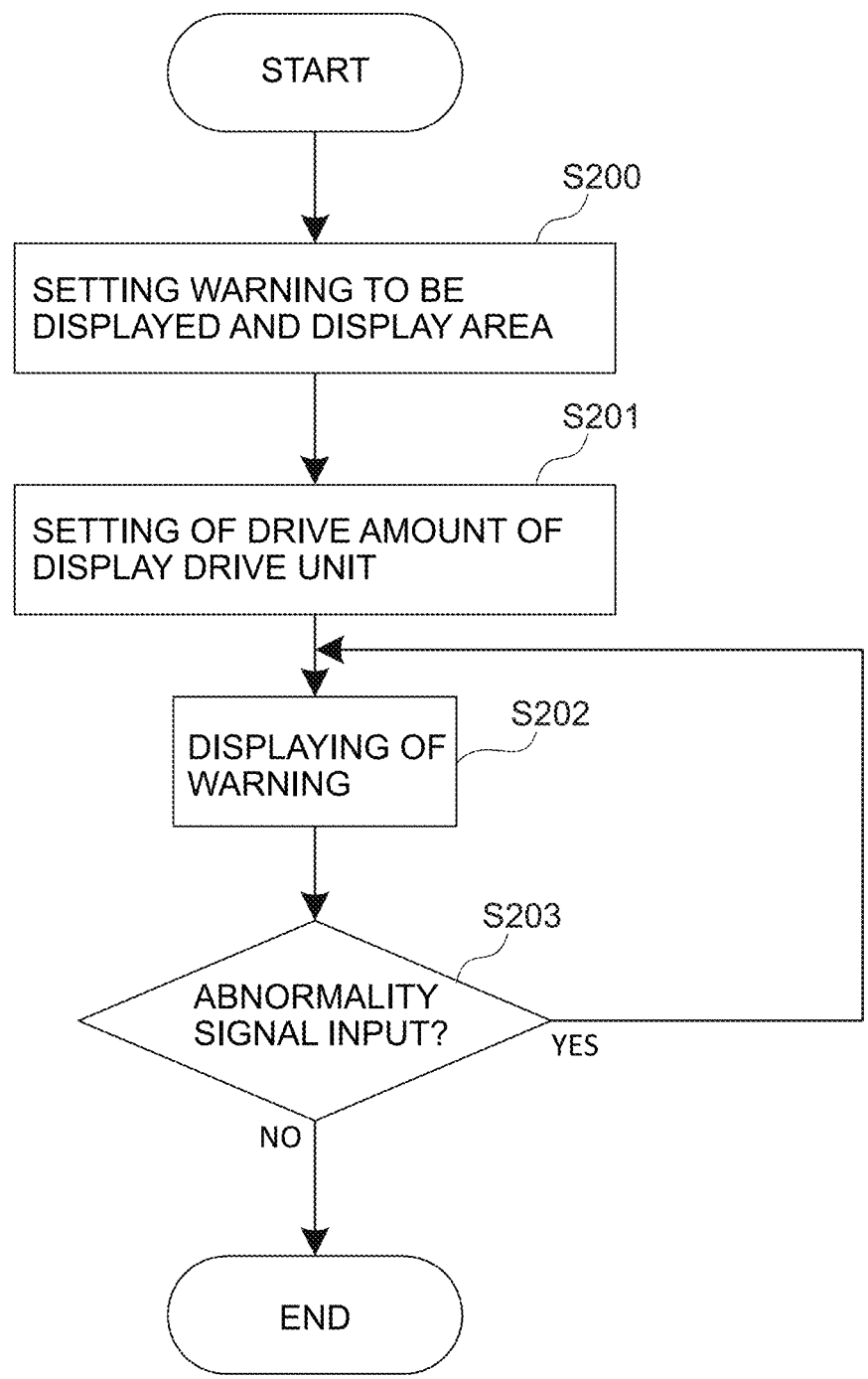
FIG. 12 is a flowchart showing an example of processing performed, at a time at which a warning is displayed, by the control device installed at a vehicle provided with the display device for a vehicle according to the first embodiment.
Figure 13:
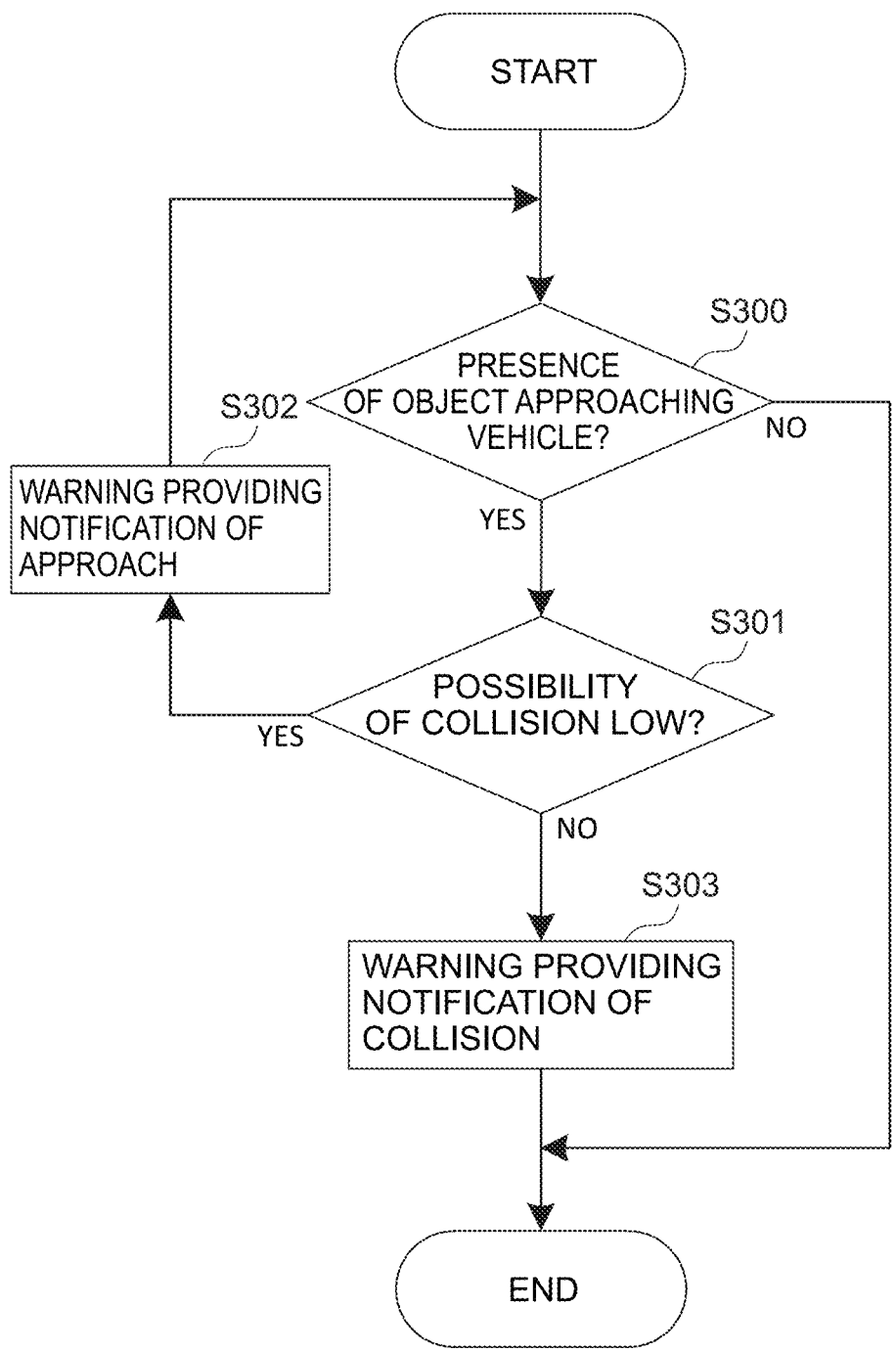
FIG. 13 is a flowchart showing an example of processing performed, at a time at which an object is approaching, by the control device installed at a vehicle provided with the display device for a vehicle according to the first embodiment.

A more detailed explanation follows regarding control of the display device for a vehicle 10 by the control device 40, mainly with reference to the flowcharts shown in FIGS. 11 to 13.

First, the control flow when setting information is displayed at the display surface 42 of the display 38 will be described with reference to FIG. 11. The control flow is started when the control device 40 receives, from the antenna 94, a detection signal that indicates detection of the portable device 102 of the occupant 28.

When this control flow is started, in step S100, the CPU 74 of the control device 40 functions as the setting information display control unit 110, and in response to the setting information input by the occupant 28 at the display operating device 98, the time when the setting information is displayed and the like, the setting information that is displayed at the display surface 42, the display area that displays the setting information, and the time when the setting information is displayed are set, and the processing proceeds to step S101.

In step S101, the CPU 74 functions as the display drive control unit 116, and sets a drive amount of the motor 56 of the display drive unit 44 such that the display area of the display surface 42 set in step S100 and the exposed area of the display surface 42 are the same area, and the processing proceeds to step S102.

In step S102, the CPU 74 functions as the setting information display control unit 110 and the display drive control unit 116, drives the display drive unit 44 such that the exposed area of the display surface 42 becomes the exposed area set in step S101, and causes the setting information set in step S100 to be displayed at the display surface 42 for a predetermined time. Then, by the control of the CPU 74, the display 38 is stored until the normal state, and the control flow ends.

Next, the control flow when warning information based on the vehicle state detection sensor 88 is displayed at the display surface 42 of the display 38 will be described with reference to FIG. 12. The control flow is started when the control device 40 receives an abnormality signal from the vehicle state detection sensor 88.

When the control flow is started, in step S200, the CPU 74 of the control device 40 functions as the warning display control unit 114, and, based on the abnormality signal that is input from the door open/closed sensor or the seatbelt sensor, sets a warning that is displayed at the display surface 42 and the display area that displays the warning, and the processing proceeds to step S201.

In step S201, the CPU 74 functions as the display drive control unit 116, and sets a drive amount of the motor 56 of the display drive unit 44 such that the display area of the display surface 42 set in step S200 and the exposed area of the display surface 42 are the same area, and the processing proceeds to step S202.

In step S202, the CPU 74 functions as the warning information display control unit 114 and the display drive control unit 116, drives the display drive unit 44 such that the exposed area of the display surface 42 becomes the exposed area set in step S201, displays the warning set in step S200 at the display surface 42, and the processing proceeds to S203.

In step S203, the CPU 74 functions as the warning display control unit 114 and the display drive control unit 116, and determines whether or not an abnormality signal is input. Then, in a case in which input of the abnormality signal is continuing (step S203: YES), the processing returns to step S202. On the other hand, in a case in which an abnormality signal is not being input (step S203: NO), the display 38 is stored until the normal state by the control of the CPU 74, and the control flow ends.

Next, the control flow when warning information based on the external sensor 90 is displayed at the display surface 42 of the display 38 will be described with reference to FIG. 13. The control flow is started when the control device 40 receives a predetermined signal at each predetermined time.

In step S300, the CPU 74 of the control device 40 functions as the warning display control unit 114, and determines whether or not there is an object approaching the vehicle 12 based on the data acquired from the external sensor 90. Then, in a case in which there is an object approaching the vehicle 12 (step S300: YES), the processing proceeds to step S301, and in a case in which there is not an object approaching the vehicle 12 (step S300: NO), the control flow ends.

In step S301, the CPU 74 of the control device 40 functions as the warning display control unit 114, and determines the level of possibility of collision between the object approaching the vehicle 12 and the vehicle 12. Then, in a case in which the possibility of collision between the object approaching the vehicle 12 and the vehicle 12 is low (step S301: YES), the processing proceeds to step S302, and in a case in which the possibility of collision between the object approaching the vehicle 12 and the vehicle 12 is high (step S301: NO), the processing proceeds to step S303.

In step S302, the CPU 74 of the control device 40 functions as the warning display control unit 114 and the display drive control unit 116, and sets the display area of the display surface 42 as the first display area. Then, the CPU 74 drives the display drive unit 44 such that the exposed area of the display surface 42 becomes the first display area, displays an object and a warning providing notification of approach of the object at the display surface 42, and the processing returns to step S300.

In step S303, the CPU 74 of the control device 40 functions as the warning display control unit 114 and the display drive control unit 116, and sets the display area of the display surface 42 as the second display area. Then, the CPU 74 drives the display drive unit 44 such that the exposed area of the display surface 42 becomes the second display area, displays an object and a warning providing notification of collision with the object at the display surface 42, and the control flow ends.

Figure 4:
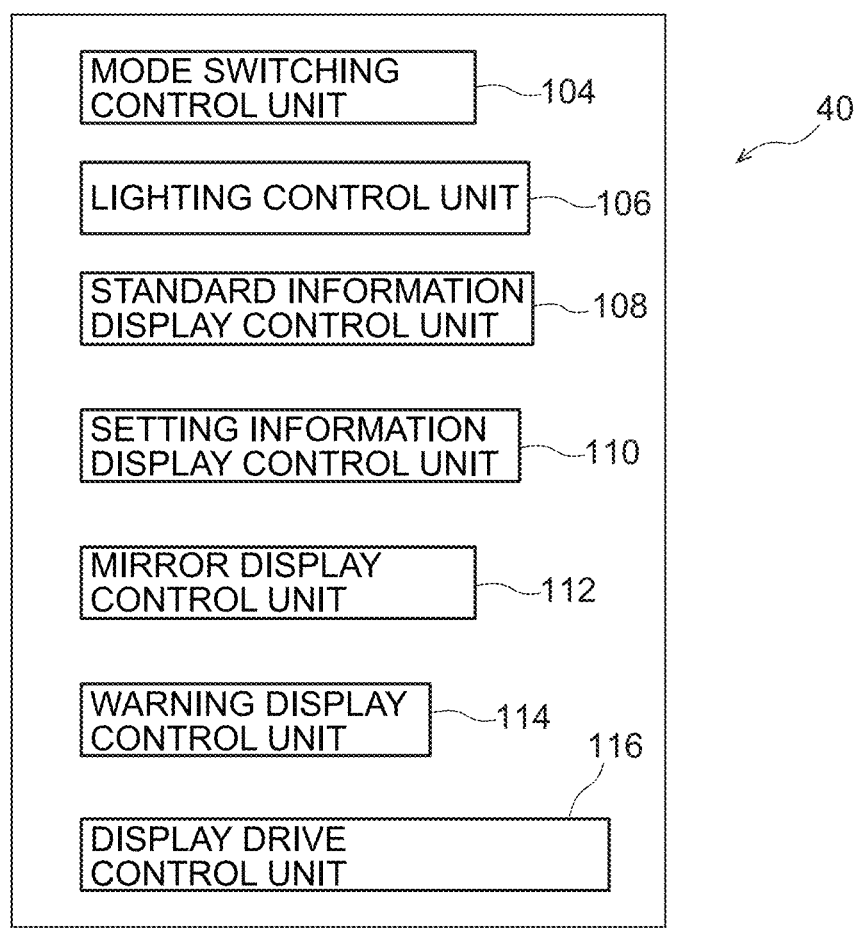
FIG. 4 is a block diagram showing a functional configuration of a control device installed at a vehicle provided with the display device for a vehicle according to the first embodiment.

Further, according to the present embodiment, as shown in FIG. 4, the display 38 can change to the lighting mode in response to an operation by the occupant 28, and in the lighting mode, the display surface 42 functions as a light that illuminates the inside of the vehicle cabin 14. Further, in the present embodiment, at least one of setting of the brightness of the light that is emitted from the display surface 42 or setting of the exposed area of the display surface 42 can be performed in response to an operation by the occupant 28. Therefore, in the present embodiment, it is possible to ensure a light source around the display 38 in the vehicle cabin 14 and adjust illumination light without providing separate lighting around the display 38. Accordingly, in the present embodiment, the function of displaying information and the lighting function can be integrated at the display 38, and the configuration inside the vehicle cabin 14 can be simplified.

Further, in the present embodiment, as shown in FIG. 1, the in-vehicle camera 92 is provided, and the occupant 28 is imaged by the in-vehicle camera 92. In the present embodiment, as shown in FIG. 7, the display 38 can change to the mirror mode in response to an operation by the occupant 28, and in the mirror mode, an image of the occupant 28, imaged by the in-vehicle camera 92, is displayed at the display surface 42. Therefore, in the present embodiment, the display surface 42 of the display 38 can be used as a mirror. Further, in the present embodiment, the exposed area of the display surface 42 can be set in response to an operation by the occupant 28, and as a result, a mirror image of the occupant 28 can be displayed at the display surface 42 to the extent required by the occupant 28. Accordingly, in the present embodiment, a mirror image of the occupant 28 can be displayed at a position that is visible to the occupant 28 without installing a mirror in the vehicle cabin 14.

Further, in the present embodiment, in a state in which the display 38 is in the mirror mode, the peripheral edge portion of the display surface 42 is set as the light emitting portions 118, and white light is irradiated from the light emitting portions 118. Therefore, in the present embodiment, the peripheral edge of the display surface 42 can function as a mirror light in the mirror mode. Accordingly, in the present embodiment, a mirror image of the occupant displayed at the display surface can be made clearer.

In addition, in the present embodiment, as shown in FIG. 2, the display 38 includes an organic electroluminescent element and is film-shaped, and when the display 38 is stored, the display 38 can be bent and deformed. Accordingly, in the present embodiment, it is possible to suppress expansion of the space required to store the display 38, as compared to a configuration in which a liquid crystal display is adopted as the display 38.

Second Embodiment

Figure 14:
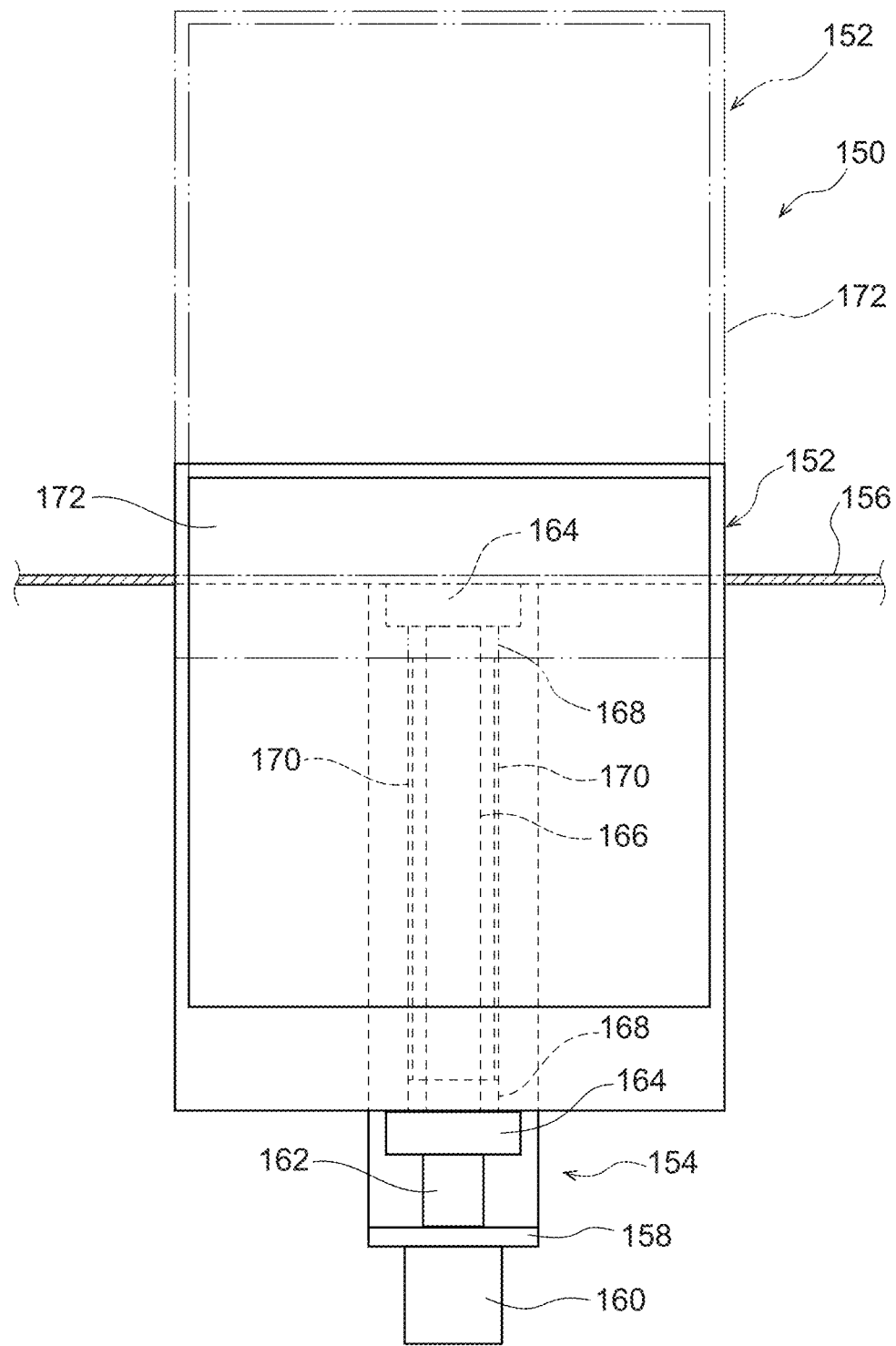
FIG. 14 is a side view schematically showing a configuration of a vehicle provided with a display device for a vehicle according to a second embodiment.

Explanation follows regarding the second embodiment of the display device for a vehicle according to the present disclosure, with reference to FIG. 14. The same reference numerals are assigned to components that are identical to those in the first embodiment described above, and description thereof is omitted.

A display device for a vehicle 150 according to the present embodiment has a similar configuration to the display device for a vehicle 10 according to the first embodiment. However, in the present embodiment, the feature of a liquid crystal display 152 being provided as the display unit instead of the display 38 and the feature of a ball screw device 154 being provided as the drive unit instead of the display drive unit 44 are different from the display device for a vehicle 10 described above.

Specifically, the liquid crystal display 152 is covered by an instrument panel 156 from the vehicle upper side and the vehicle rear side when not in use. An insertion portion (not shown) through which the liquid crystal display 152 can be inserted is formed at a vehicle upper side portion of the instrument panel 156.

On the other hand, the ball screw device 154 includes a base portion 158, a motor 160, a coupling 162, a pair of bearings 164, a screw portion 166, a nut portion 168, and a pair of guide rails 170.

More specifically, the motor 160 is connected to the screw portion 166 via the coupling 162, and the driving force of the motor 160 can be transmitted to the screw portion 166. Further, the screw portion 166 extends in the vehicle up-down direction, and both ends of the screw portion 166 are fixed to the base portion 158 by the bearings 164. The nut portion 168 is engaged with the screw portion 166, and the liquid crystal display 152 is fixed to the nut portion 168. Further, the nut portion 168 is guided in the vehicle up-down direction by the guide rails 170.

According to such a configuration, by controlling the ball screw device 154 by the control device 40, the liquid crystal display 152 is driven in the vehicle up-down direction and an exposed area, of a display surface 172 of the liquid crystal display 152, which is exposed from the instrument panel 156, can be adjusted. Therefore, also by this embodiment, similar operation and effects to those in the first embodiment described above are exhibited except for the operation and effects due to the display unit including an organic electroluminescence element.

Third Embodiment

Figure 15:
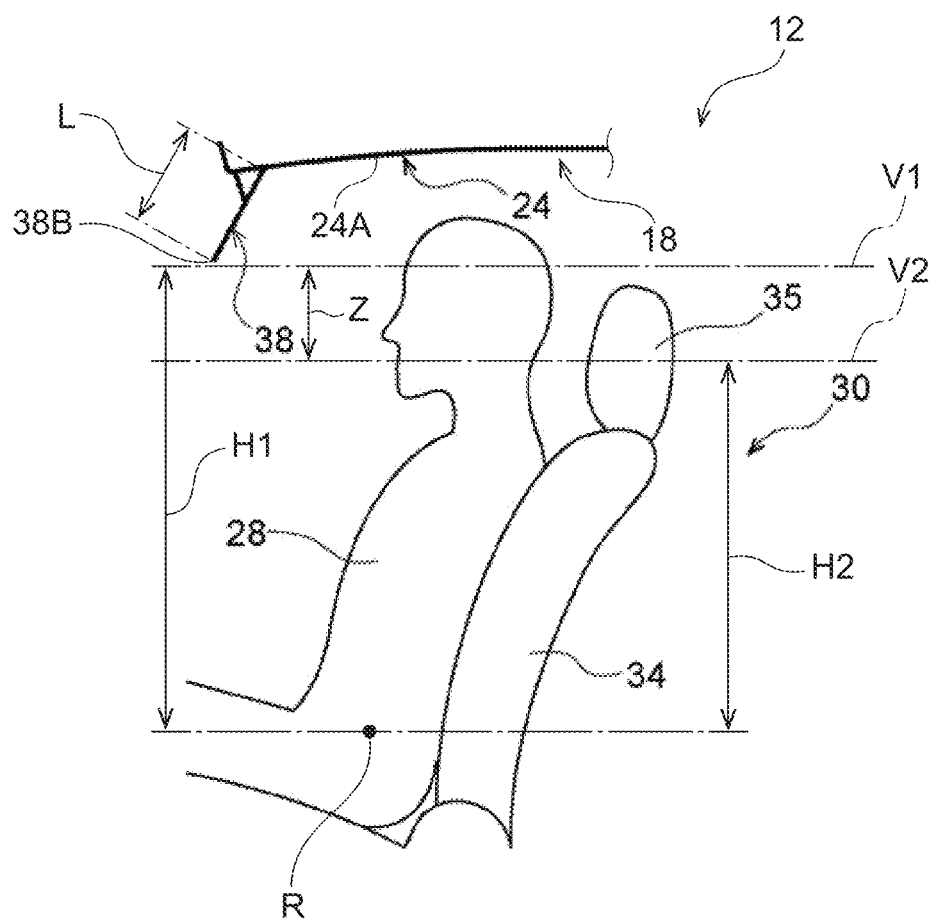
FIG. 15 is a side view schematically showing a relationship between a field of view of an occupant and a protrusion amount of the display unit in the display device for a vehicle according to a third embodiment.
Figure 16:
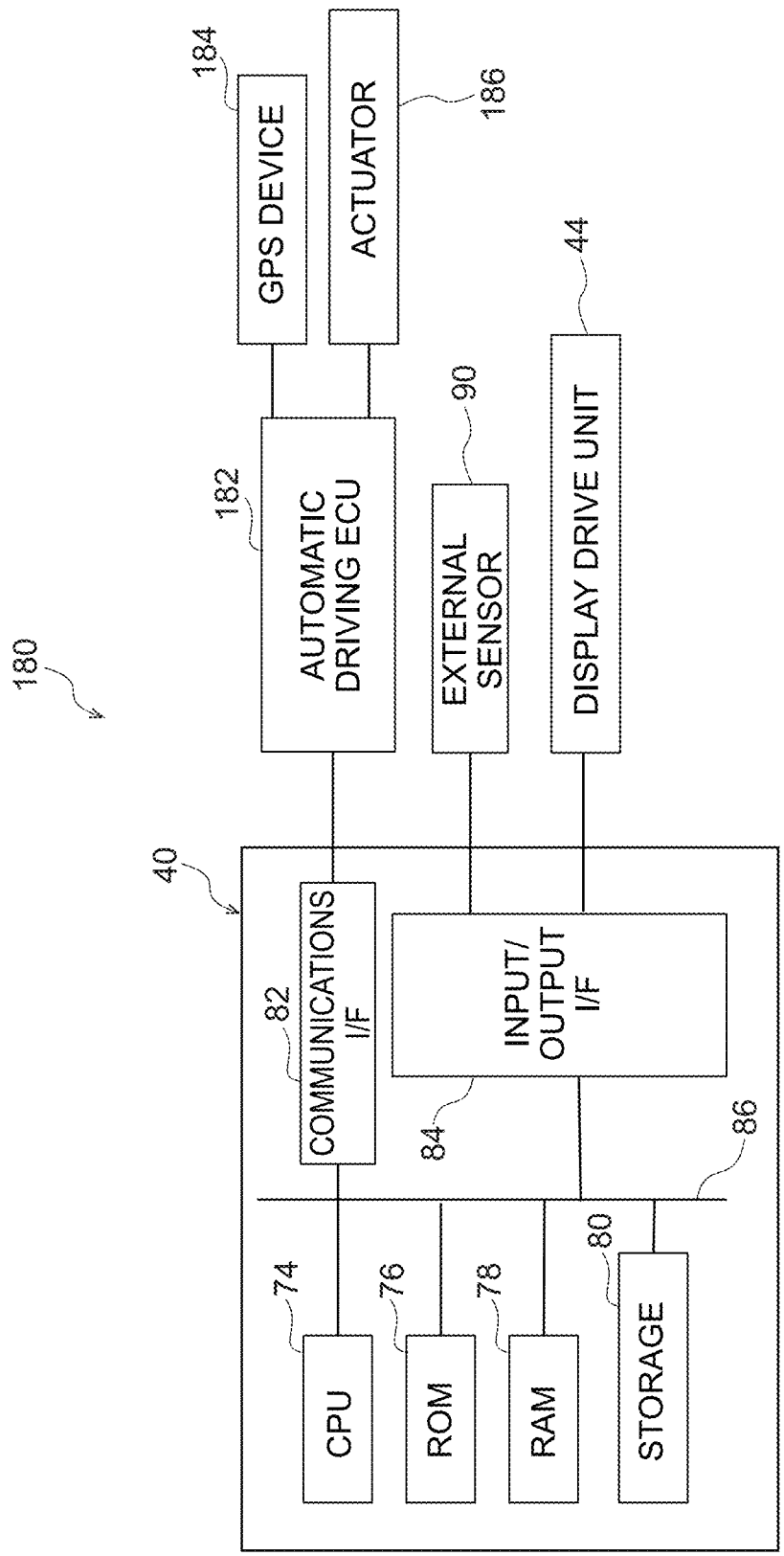
FIG. 16 is a block diagram showing a relationship between devices installed at a vehicle provided with the display device for a vehicle according to the third embodiment.

Explanation follows regarding the third embodiment of the display device for a vehicle according to the present disclosure, with reference to FIG. 15 and FIG. 16. The same reference numerals are assigned to components that are identical to those in the first embodiment described above, and description thereof is omitted.

In the present embodiment, in addition to the vehicle 12 being able be automatically driven, during manual driving of the vehicle 12, a protrusion amount L of the display 38 from the roof trim 24 can be restricted by a display device for a vehicle 180 according to the present embodiment.

Specifically, as shown in FIG. 16, while the display device for a vehicle 180 has a similar configuration to the display device for a vehicle 10 according to the first embodiment, the communications I/F 82 of the control device 40 is electrically connected to an automatic driving ECU 182 (hereinafter referred to as ECU 182) as an automatic driving control unit. The data that is acquired by the external sensor 90 is transmitted to the ECU 182 via the control device 40.

The ECU 182 is capable of controlling an automatic driving system that is installed at the vehicle 12 in a state in which the vehicle 12 has switched from a manual driving mode to an automatic driving mode by operation of a changeover switch (not shown) by the occupant 28. A GPS (global positioning system) device 184, as a vehicle location detection element, and a drive actuator 186 are electrically connected to the ECU 182.

The GPS device 184 is a device that measures the current location of the vehicle 12, and includes an antenna (not shown) that receives a signal from a GPS satellite (not shown). The GPS device 184 may be directly connected to the control device 40.

The drive actuator 186 includes a steering actuator, a brake actuator, and a power unit actuator (none of which are shown). The steering actuator includes a motor (not shown) and drives a steering device (not shown) based on a signal that is output from the ECU 182, and a steering angle of a steering wheel (not shown), which is controlled by the ECU 182, is reflected during automatic driving.

The brake actuator includes a motor (not shown) and drives a brake device (not shown) based on a signal that is output from the ECU 182, and control by the ECU 182 is reflected in the braking of the vehicle 12 during automatic driving.

The power unit actuator includes a motor (not shown) and drives a power unit (not shown) based on a signal that is output from the ECU 182, and control by the ECU 182 is reflected in the drive of the vehicle 12 during automatic driving.

Further, in the present embodiment, the storage 80 of the control device 40 stores a display unit management table in which a predetermined country or region and a corresponding value of the protrusion amount L are associated with each other. As shown in FIG. 15, the term protrusion amount L as used herein means an extension length of the display 38 from the roof trim 24 when a vehicle front side end portion 38B of the display 38 is positioned directly above a predetermined range Z, which is in a field of view of the occupant 28, in the vehicle up-down direction.

Here, the range Z means, in the vehicle up-down direction, a region between a plane V1 that extends in the vehicle front-rear direction and the vehicle width direction at a predetermined distance H1 at the vehicle upper side from a seating reference point R, to a plane V2 that extends in the vehicle front-rear direction and the vehicle width direction at a predetermined distance H2, which is shorter than the distance H1, at the vehicle upper side from the seating reference point R. The range Z is determined based on each specification of the vehicle 12 and the laws and regulations of each country or region.

The value of the protrusion amount L is stored at the storage 80 as a rotation speed of the motor 56 in the display drive unit 44 which is required for the display 38 to extend from the normal state until the end portion 38B is positioned directly above the range Z. That is, the value of the protrusion amount L is set in accordance with each specification of the vehicle 12 and the laws and regulations of each country or region.

Here, in the present embodiment, the control device 40 acquires the location information of the vehicle 12 from the GPS device 184 via the ECU 182 in a state in which the vehicle 12 is in the manual driving mode. Then, the control device 40 reads, from the storage 80, the value of the protrusion amount L that corresponds to the location of the vehicle 12, and by the control device 40 functioning as the warning display control unit 114 and the display drive control unit 116, the exposed area of the display surface 42 is adjusted in accordance with the protrusion amount L, and the second display area is set based on the exposed area.

According to such a configuration, automatic driving of the vehicle 12 is controlled by the ECU 182 in the automatic driving mode. During automatic driving of the vehicle 12 or parking of the vehicle 12, the warning display control unit 114 can display information at the entire surface of the display surface 42. Therefore, in the present embodiment, it is possible to ensure the area of the display surface 42 that is visible to the occupant 28 during automatic driving of the vehicle 12 or parking of the vehicle 12.

On the other hand, during manual driving of the vehicle 12, the display drive control unit 116 controls the drive amount of the display drive unit 44 such that the display 38 is positioned outside the predetermined range Z, which is in the field of view of the occupant 28, in the vehicle up-down direction. As a result, the exposed area of the display surface 42 is limited as compared with a case in which the vehicle 12 is being automatically driven or the vehicle 12 is being parked. The warning display control unit 114 sets the second display area based on the exposed area of the display surface 42.

Therefore, in the present embodiment, various information can be displayed to the occupant 28 via the display surface 42 while suppressing the display surface 42 from obstructing the field of view of the occupant 28 during manual driving of the vehicle 12. Accordingly, in the present embodiment, information can be appropriately displayed to the occupant 28 while ensuring the field of view of the occupant 28 during manual driving.

Fourth Embodiment

Figure 17:
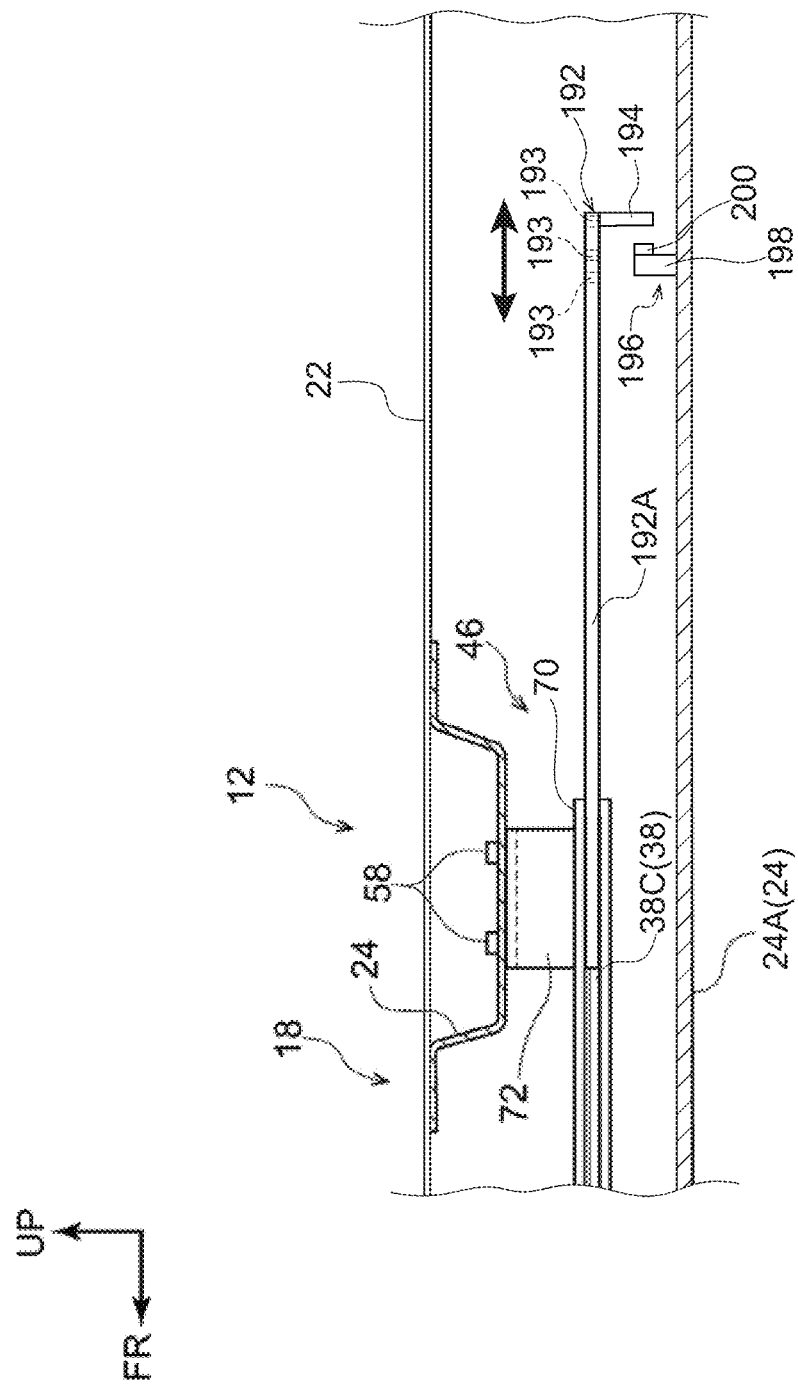
FIG. 17 is a cross section view, as seen in the vehicle width direction, schematically showing a configuration of the main parts of the display device for a vehicle according to a fourth embodiment.

Explanation follows regarding the fourth embodiment of the display device for a vehicle according to the present disclosure, with reference to FIG. 17 and FIG. 18. The same reference numerals are assigned to components that are identical to those in the second embodiment described above, and description thereof is omitted.

In the present embodiment, a display device for a vehicle 190 according to the present embodiment is provided with a contact sensor 196, and it is possible to limit the protrusion amount L of the display 38 from the roof trim 24 by the contact sensor 196.

Specifically, as shown in FIG. 17, a stopper base 192 having a plate thickness direction in the vehicle up-down direction and a rectangular plate shape when viewed in the vehicle up-down direction is attached to the vehicle rear side end portion 38C of the display 38. Each of vehicle width direction end portions 192A of the stopper base 192 is inserted into the corresponding guide rail 70, and the stopper base 192 can be slidably moved along the guide rails 70.

Further, plural fitting portions 193 are provided with spaces therebetween in the vehicle front-rear direction at a vehicle rear side portion of the stopper base 192, and a square columnar stopper 194 is fitted into one of these. Then, the stopper 194 is in a state of protruding from the stopper base 192 to the vehicle lower side.

On the other hand, the contact sensor 196 includes a sensor main body 198 that is attached to a vehicle upper side surface of the ceiling surface portion 24A of the roof trim 24, and a push switch 200 that is attached to a vehicle rear side surface of the sensor main body 198. As shown in FIG. 18, the contact sensor 196 is electrically connected to the input/output I/F 84 of the control device 40, and a stop signal is transmitted to the control device 40 by the push switch 200 being pressed.

Then, when the control device 40 receives the stop signal from the contact sensor 196, the control device 40 controls the display drive unit 44 to stop the display 38 from being sent out to the vehicle front side, and at this time, the control device 40 sets the exposed area of the display surface 42 as a maximum display area and stores the exposed area in the storage 80.

According to such a configuration, when the display 38 is sent out to the vehicle front side, the push switch 200 is pressed by the stopper 194, and sending out of the display 38 is stopped at a predetermined position. By appropriately selecting the fitting portion 193 to which the stopper 194 is fitted, the protrusion amount L can be set in accordance with the laws and regulations of each country or region. Therefore, in the present embodiment, similar operation and effects to those in the third embodiment described above are exhibited except for the display area being limited in the mirror mode.

Further, in the present embodiment, the protrusion amount L can be adjusted by only changing the position of the stopper 194 without acquiring location information of the vehicle 12 from the GPS device 184.

Additional Explanation of Above Embodiments (1) In the embodiments described above, although a device provided with a rack and pinion mechanism or a ball screw mechanism is adopted as the drive unit that moves the display unit in and out of the interior member, a mechanism that can be adopted as the drive unit is not limited to this. For example, a device provided with a pantograph mechanism may be adopted as the drive unit in accordance with the specifications of the vehicle 12.

(2) Further, in the first embodiment described above, although an organic electroluminescence display is adopted as the display unit, the present disclosure is not limited to this. For example, plural small liquid crystal displays that are connected may be adopted as the display unit in accordance with the specifications of the vehicle 12.

(3) In addition, in the third embodiment and the fourth embodiment described above, although a film-shaped display unit provided with an organic electroluminescent element is adopted in a similar manner to in the first embodiment, the present disclosure is not limited to this. That is, in the third embodiment and the fourth embodiment described above, it is also possible to adopt a liquid crystal display that extends from the instrument panel to the vehicle upper side in a similar manner to in the second embodiment. In this case, the protrusion amount of the liquid crystal display from the instrument panel is set to a value at which a vehicle upper side end portion of the liquid crystal display is position directly below the range Z.

What is claimed is:

1. A display device for a vehicle, comprising:
 a display unit including a display surface that is configured to display information to an occupant of the vehicle;
 a display control unit that is configured to set (i) the information displayed at the display surface and (ii) a display area in which the information is displayed at the display surface;
 a drive unit that is configured to drive the display unit in and out of an interior member that is disposed in a vehicle cabin;
 a drive control unit that is configured to control the drive unit such that the display area and an exposed area, of the display surface, which is exposed from the interior member are proportional to each other; and
 a warning display control unit that is configured to
  determine, while the vehicle is moving, whether an object is approaching the vehicle, and
  in response to determining the object approaching the vehicle, determine a possibility of collision with the object, wherein the display control unit is further configured to
set the information and the display area based on a signal from an exterior sensor that is configured to acquire surrounding conditions of the vehicle while the vehicle is moving,
in response to the warning display control unit determining the possibility of collision with the object being lower than a predetermined value,
the display control unit is configured to set (i) the information including a first warning of the object approaching the vehicle, and (ii) the display area to a first display area, and
the drive control unit is configured to control the drive unit to expose the first display area of the display surface from the interior member, and
in response to the warning display control unit determining the possibility of collision with the object being higher than the predetermined value,
the display control unit is configured to set (i) the information including a second warning of the possibility of collision with the object, and (ii) the display area to a second display area, which is larger than the first display area, and
the drive control unit is configured to control the drive unit to expose the second display area of the display surface from the interior member.

2. The display device according to claim 1, wherein:
the display control unit is further configured to
in response to a degree of urgency of the surrounding conditions being lower than a predetermined degree, set the display area to the first display area, and
in response to the degree of urgency of the surrounding conditions being higher than the predetermined degree, set the display area to the second display area.

3. The display device according to claim 1, wherein, while the vehicle is unlocked, the display unit is configured to at least
display a predetermined word as the information or
irradiate a predetermined light from the display surface.

4. The display device according to claim 1, wherein:
the display unit is configured to change to a lighting mode in which the display surface functions as a light that illuminates the vehicle cabin of the vehicle; and
(a) changing to the lighting mode of the display unit, and (b) setting of at least one of a brightness of light emitted from the display surface or the exposed area, are performed in response to an operation by the occupant.

5. The display device according to claim 1, further comprising:
an in-vehicle camera that is configured to image the occupant, wherein:
the display unit is configured to change to a mirror mode that displays an image of the occupant, imaged by the in-vehicle camera, at the display surface; and
changing to the mirror mode of the display unit and setting the exposed area are performed in response to an operation by the occupant.

6. The display device according to claim 5, wherein,
in a state in which the display unit is in the mirror mode, a peripheral edge portion of the display surface is set as a light emitting portion that is configured to emit white light.

7. The display device according to claim 1, wherein
the display unit includes an organic electroluminescent element and is film-shaped.

8. The display device according to claim 1, further comprising:
an automatic driving control unit that is configured to control automatic driving of the vehicle, wherein:
during the automatic driving of the vehicle or during parking of the vehicle, the display control unit is configured to display the information at the second display area being an entirety of the display surface; and
during manual driving of the vehicle,
the drive control unit is configured to control a drive amount of the drive unit to position the display unit outside a predetermined range, which is in a field of view of the occupant, in a vehicle up-down direction, and
the display control unit is configured to set the display area based on the exposed area.

9. The display device according to claim 8, further comprising:
a vehicle location detection element that is configured to detect a location of the vehicle, wherein:
the drive control unit is configured to control the drive amount in accordance with the predetermined range, which is set to a country or region in which the vehicle is located, as detected by the vehicle location detection element.

10. The display device according to claim 1, wherein
the second display area corresponds to an entirety of the display surface.

11. The display device according to claim 10, wherein
the warning display control unit is further configured to, in response to an abnormality signal input from a door open/closed sensor of the vehicle or a seatbelt sensor of the vehicle, set (i) the information including a third warning, and (ii) the display area to display the third warning wherein the door open/closed sensor is configured to detect an open state and a closed state of the door of the vehicle, and the seatbelt sensor is configured to detect a fastening state of a seatbelt.

12. The display device according to claim 11, wherein
the interior member is a roof trim of the vehicle that is configured to cover a roof panel of the vehicle,
the display device further comprises a contact sensor that is configured to limit a protrusion amount of the display unit protruding from the roof trim, the contact sensor including
a sensor main body attached to the roof trim, and
a push switch attached to the sensor main body,
the display unit is attached with a stopper base, and
the drive unit is configured to, in response to the stopper base pressing the push switch, stop the driving of the display unit.

* * * * *